United States Patent
Lönnroth et al.

(10) Patent No.: US 11,912,618 B2
(45) Date of Patent: Feb. 27, 2024

(54) CHEMICALLY DURABLE ALUMINOSILICATE GLASS COMPOSITIONS AND GLASS ARTICLES FORMED THEREFROM

(71) Applicant: CORNING INCORPORATED, Corning, NY (US)

(72) Inventors: Nadja Teresia Lönnroth, Helsinki (FI); Lina Ma, Corning, NY (US); Robert Anthony Schaut, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 463 days.

(21) Appl. No.: 16/809,641

(22) Filed: Mar. 5, 2020

(65) Prior Publication Data
US 2020/0290920 A1    Sep. 17, 2020

Related U.S. Application Data

(60) Provisional application No. 62/819,184, filed on Mar. 15, 2019.

(51) Int. Cl.
| | | |
|---|---|---|
| B32B 15/04 | (2006.01) | |
| B32B 17/06 | (2006.01) | |
| C03C 3/087 | (2006.01) | |
| A61J 1/14 | (2023.01) | |
| C03C 3/091 | (2006.01) | |
| C03C 3/095 | (2006.01) | |
| C03C 4/18 | (2006.01) | |
| C03C 4/20 | (2006.01) | |

(52) U.S. Cl.
CPC ............ *C03C 3/087* (2013.01); *A61J 1/1468* (2015.05); *C03C 3/091* (2013.01); *C03C 3/095* (2013.01); *C03C 4/18* (2013.01); *C03C 4/20* (2013.01); *C03C 2204/00* (2013.01)

(58) Field of Classification Search
CPC ....................................................... C03C 4/20
USPC ....................................................... 428/426
See application file for complete search history.

(56) References Cited

U.S. PATENT DOCUMENTS

| | | | |
|---|---|---|---|
| 8,753,994 B2 | 6/2014 | Danielson et al. | |
| 9,340,447 B2 | 2/2016 | Danielson et al. | |
| 10,384,975 B2 | 8/2019 | Yamamoto et al. | |
| 10,640,415 B2 | 5/2020 | DeMartino et al. | |
| 11,319,242 B2 * | 5/2022 | Hong | C03C 4/20 |
| 2011/0098172 A1 * | 4/2011 | Brix | C03C 4/20 501/64 |
| 2012/0183812 A1 | 7/2012 | Kajita | |
| 2013/0034670 A1 * | 2/2013 | Hashimoto | C03C 3/095 428/1.32 |
| 2013/0101764 A1 * | 4/2013 | Schaut | C03C 3/087 428/34.4 |
| 2013/0344263 A1 | 12/2013 | Danielson et al. | |
| 2014/0106168 A1 | 4/2014 | Ritter et al. | |
| 2014/0323287 A1 | 10/2014 | Tratzky et al. | |
| 2015/0246846 A1 | 9/2015 | Choju et al. | |
| 2016/0095796 A1 | 4/2016 | Weeks et al. | |
| 2016/0107924 A1 * | 4/2016 | Yamamoto | C03C 3/093 501/67 |
| 2017/0081239 A1 * | 3/2017 | Schwall | C03C 4/18 |
| 2017/0088456 A1 | 3/2017 | Rampf et al. | |
| 2017/0320770 A1 * | 11/2017 | Schwall | C03C 4/20 |
| 2017/0327407 A1 * | 11/2017 | Drake | C03C 21/002 |
| 2018/0186685 A1 * | 7/2018 | Murayama | C03C 21/00 |
| 2019/0062201 A1 * | 2/2019 | Weiss | C03C 10/0027 |

FOREIGN PATENT DOCUMENTS

| | | |
|---|---|---|
| CN | 104066695 A | 9/2014 |
| CN | 106746599 A | 5/2017 |
| EP | 3403997 A1 | 11/2018 |
| RU | 2580857 C1 | 4/2016 |

(Continued)

OTHER PUBLICATIONS

Day et al; "Properties of Soda Aluminosilicate Glasses: I, Refractive Index, Denisty, Molar Refractivity, and Infrared Absorption Spectra" ; Journal of the American Ceramic Society 45, No. 10 (1962): pp. 489-496.

Day; "Mixed Alkali Glasses—Their Properties and Uses" ; Journal of Non-Crystalline Solids 21, No. 3 (1976): pp. 343-372.

Erbe et al; "Properties of Sm2O3—Al2O3—SiO2 Glasses for In Vivo Applications" ; Journal of the American Ceramic Society 73, No. 9 (1990): pp. 2708-2713.

Gin et al; "Nuclear Glass Durability: New Insight Into Alteration Layer Properties" ; The Journal of Physical Chemistry C 115, No. 38 (2011): pp. 18696-18706.

Hamilton et al; "Effects of Glass Structure on the Corrosion Behavior of Sodium-Aluminosilicate Glasses" ; Journal of Non-Crystalline Solids 222 (1997): pp. 167-174.

(Continued)

*Primary Examiner* — Lauren R Colgan

(74) *Attorney, Agent, or Firm* — F. Brock Riggs

(57) ABSTRACT

In embodiments, a glass composition may include: greater than or equal to 71 mol. % and less than or equal to 83 mol. % $SiO_2$; greater than or equal to 1 mol. % and less than or equal to 11 mol. % $Al_2O_3$; greater than or equal to 5 mol. % and less than or equal to 18 mol. % alkali oxide, the alkali oxide comprising greater than 3 mol. % $Li_2O$ and at least one of $Na_2O$ and $K_2O$; greater than or equal to 1 mol. % and less than or equal to 8 mol. % alkaline earth oxide, the alkaline earth oxide comprising MgO and at least one of CaO, BaO, and SrO; and at least one of $TiO_2$, $ZrO_2$, $HfO_2$, $La_2O_3$ and $Y_2O_3$, wherein $TiO_2+ZrO_2+HfO_2+La_2O_3+Y_2O_3$ is greater than 0 mol. % and less than or equal to 6 mol. % and $Al_2O_3+TiO_2+ZrO_2+HfO_2+La_2O_3+Y_2O_3$ is greater than or equal to 2 mol. % and less than or equal to 12 mol. %.

46 Claims, No Drawings

(56) References Cited

FOREIGN PATENT DOCUMENTS

RU            2674269 C2    12/2018
WO    2014/196655 A1    12/2014

OTHER PUBLICATIONS

Jantzen; "Systems Approach to Nuclear Waste Glass Development"; Journal of Non-Crystalline Solids 84, No. 1 (1986): pp. 215-225.
Lee et al; "The Structure of Aluminosilicate Glasses: High-Resolution 17O and 27Al MAS and 3QMAS NMR Study"; The Journal of Physical Chemistry B 104, No. 17 (2000): pp. 4091-4100.
Lutze et al; "Radioactive Waste Forms for the Future." (1988); International Nuclear Information System; 2 Pages; Abstract Only.
International Search Report and Written Opinion of the International Searching Authority; PCT/US2020/020864; dated Jun. 9, 2020; 8 Pages; European Patent Office.
Russian Patent Application No. 2021129186, Office Action, dated Apr. 13, 2022; 06 pages; Russian Patent Office.

* cited by examiner

CHEMICALLY DURABLE ALUMINOSILICATE GLASS COMPOSITIONS AND GLASS ARTICLES FORMED THEREFROM

CROSS REFERENCE TO RELATED APPLICATIONS

This application claims the benefit of priority under 35 U.S.C § 120 of U.S. Provisional Application Ser. No. 62/819,184 filed on Mar. 15, 2019, the content of which is relied upon and incorporated herein by reference in its entirety

BACKGROUND

Field

The present specification generally relates to aluminosilicate glass compositions and, more specifically, to chemically durable aluminosilicate glass compositions and glass articles formed therefrom.

Technical Background

Historically, glass has been used as the preferred material for packaging pharmaceuticals because of its hermeticity, optical clarity and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard "Type IA" and "Type 1B" glass compositions which are alumino-borosilicate glasses.

It has been found that alumino-borosilicate glasses may demonstrate a propensity for delamination. This propensity for delamination has been linked to the higher concentration of borate species in alumino-borosilicate glasses. It is believed that reducing or eliminating borate species from the glass may mitigate the propensity for delamination.

Accordingly, a need exists for aluminosilicate glasses which exhibit chemical durability.

SUMMARY

According to a first aspect A1, a glass composition may include: greater than or equal to 71 mol. % and less than or equal to 83 mol. % $SiO_2$; greater than or equal to 1 mol. % and less than or equal to 11 mol. % $Al_2O_3$; greater than or equal to 5 mol. % and less than or equal to 18 mol. % alkali oxide, the alkali oxide comprising greater than 3 mol. % $Li_2O$ and at least one of $Na_2O$ and $K_2O$; greater than or equal to 1 mol. % and less than or equal to 8 mol. % alkaline earth oxide, the alkaline earth oxide comprising MgO and at least one of CaO, BaO, and SrO; and at least one of $TiO_2$, $ZrO_2$, $HfO_2$, $La_2O_3$ and $Y_2O_3$, wherein $TiO_2$ (mol. %)+$ZrO_2$ (mol. %)+$HfO_2$ (mol. %)+$La_2O_3$ (mol. %)+$Y_2O_3$ (mol. %) is greater than 0 mol. % and less than or equal to 6 mol. % and $Al_2O_3$ (mol. %)+$TiO_2$ (mol. %)+$ZrO_2$ (mol. %)+$HfO_2$ (mol. %)+$La_2O_3$ (mol. %)+$Y_2O_3$ (mol. %) is greater than or equal to 2 mol. % and less than or equal to 12 mol. %.

A second aspect A2 includes the glass composition of the first aspect A1, wherein $SiO_2$ (mol. %)+$Al_2O_3$ (mol. %)+$TiO_2$ (mol. %)+$ZrO_2$ (mol. %)+$HfO_2$ (mol. %)+$La_2O_3$ (mol. %)+$Y_2O_3$ (mol. %)+$B_2O_3$ (mol. %) is less than or equal to 90 mol. %.

A third aspect A3 includes the glass composition of the first aspect A1 or the second aspect A2, wherein the glass composition comprises $TiO_2$ and $ZrO_2$.

A fourth aspect A4 includes the glass composition of any of the first through third aspects A1-A3, wherein $TiO_2$ (mol. %)+$ZrO_2$ (mol. %) is less than or equal to 6 mol. %.

A fifth aspect A5 includes the glass composition of any of the first through fourth aspects A1-A4, wherein $TiO_2$ (mol. %)+$ZrO_2$ (mol. %) is less than or equal to 4 mol. %.

A sixth aspect A6 includes the glass composition of any of the first through fifth aspects A1-A5, wherein $TiO_2$ (mol. %)+$ZrO_2$ (mol. %) is less than or equal to 2 mol. %.

A seventh aspect A7 includes the glass composition of any of the first through sixth aspects A1-A6, wherein the glass composition comprises $TiO_2$, $ZrO_2$, and $HfO_2$.

An eighth aspect A8 includes the glass composition of any of the first through seventh aspects A1-A7, wherein $TiO_2$ (mol. %)+$ZrO_2$ (mol. %)+$HfO_2$ (mol. %) is less than or equal to 6 mol. %.

A ninth aspect A9 includes the glass composition of any of the first through eighth aspects A1-A8, wherein $TiO_2$ (mol. %)+$ZrO_2$ (mol. %)+$HfO_2$ (mol. %) is less than or equal to 5 mol. %.

A tenth aspect A10 includes the glass composition of any of the first through ninth aspects A1-A9, wherein the glass composition comprises $ZrO_2$ and $HfO_2$.

An eleventh aspect A11 includes the glass composition of any of the first through tenth aspects A1-A10, wherein $ZrO_2$ (mol. %)+$HfO_2$ (mol. %) is less than or equal to 4.0 mol. %.

A twelfth aspect A12 includes the glass composition of any of the first through eleventh aspects A1-A11, wherein $ZrO_2$ (mol. %)+$HfO_2$ (mol. %) is less than or equal to 2.0 mol. %.

A thirteenth aspect A13 includes the glass composition of any of the first through twelfth aspects A1-A12, wherein the $ZrO_2$ (mol. %)+$HfO_2$ (mol. %) is less than or equal to 0.5 mol. %.

A fourteenth aspect A14 includes the glass composition of any of the first through thirteenth aspects A1-A13, wherein the glass composition comprises $La_2O_3$ and the concentration of $La_2O_3$ is less than or equal to 1 mol. %.

A fifteenth aspect A15 includes the glass composition of any of the first through fourteenth aspects A1-A14, wherein the glass composition comprises $ZrO_2$ and the concentration of $ZrO_2$ greater than 1 mol. %.

A sixteenth aspect A16 includes the glass composition of any of the first through fifteenth aspects A1-A15, wherein the glass composition comprises $ZrO_2$ and the concentration of $ZrO_2$ is less than or equal to 5 mol. %.

A seventeenth aspect A17 includes the glass composition of any of the first through sixteenth aspects A1-A16, wherein the glass composition comprises $HfO_2$ and the concentration of $HfO_2$ is less than or equal to 4 mol. %.

An eighteenth aspect A18 includes the glass composition of any of the first through seventeenth aspects A1-A17, wherein the glass composition comprises $TiO_2$ and the concentration of $TiO_2$ is greater than 1 mol. %.

A nineteenth aspect A19 includes the glass composition of the eighteenth aspect A18, wherein the glass composition comprises $TiO_2$ and the concentration of $TiO_2$ is less than or equal to 6 mol. %.

A twentieth aspect A20 includes the glass composition of any of the first through nineteenth aspects A1-A19, wherein the glass composition comprises $Y_2O_3$ and the concentration of $Y_2O_3$ is less than or equal to 1 mol. %.

A twenty-first aspect A21 includes the glass composition of any of the first through twentieth aspects A1-A20, wherein $SiO_2$ is greater than or equal to 72 mol. % and less than or equal to 79 mol. %.

A twenty-second aspect A22 includes the glass composition of any of the first through twenty-first aspects A1-A21, wherein $SiO_2$ is greater than or equal to 73 mol. % and less than or equal to 78 mol. %.

A twenty-third aspect A23 includes the glass composition of any of the first through twenty-second aspects A1-A22, wherein $Al_2O_3$ is greater than or equal to 2 mol. % and less than or equal to 8 mol. %.

A twenty-fourth aspect A24 includes the glass composition of any of the first through twenty-third aspects A1-A23, wherein $Al_2O_3$ is greater than or equal to 4 mol. % and less than or equal to 8 mol. %.

A twenty-fifth aspect A25 includes the glass composition of any of the first through twenty-forth aspects A1-A24, wherein $Al_2O_3$ is greater than or equal to 5 mol. % and less than or equal to 7 mol. %.

A twenty-sixth aspect A26 includes the glass composition of any of the first through twenty-fifth aspects A1-A25, wherein $Li_2O$ (mol. %)>$Na_2O$ (mol. %)>$K_2O$ (mol. %).

A twenty-seventh aspect A27 includes the glass composition of any of the first through twenty-sixth aspects A1-A26, wherein the alkali oxide is greater than or equal to 5 mol. % and less than or equal to 13 mol. %.

A twenty-eighth aspect A28 includes the glass composition of any of the first through twenty-seventh aspects A1-A27, wherein $Li_2O$ is greater than or equal to 3 mol. % and less than or equal to 10 mol. %.

A twenty-ninth aspect A29 includes the glass composition of the twenty-eighth aspect A28, wherein $Li_2O$ is less than or equal to 8 mol. %.

A thirtieth aspect A30 includes the glass composition of any of the first through twenty-ninth aspects A1-A29, wherein $Na_2O$ is greater than or equal to 1 mol. % and less than or equal to 5 mol. %.

A thirty-first aspect A31 includes the glass composition of the thirtieth aspect A30, wherein $Na_2O$ is less than 3 mol. %.

A thirty-second aspect A32 includes the glass composition of the thirtieth aspect A30, wherein $Na_2O$ is less than 2.5 mol. %.

A thirty-third aspect A33 includes the glass composition of the thirtieth aspect A30, wherein $Na_2O$ is less than 2.0 mol. %.

A thirty-fourth aspect A34 includes the glass composition of any of the first through thirty-third aspects A1-A33, wherein $K_2O$ is greater than or equal to 1 mol. % and less than or equal to 7 mol. %.

A thirty-fifth aspect A35 includes the glass composition of the thirty-fourth aspect A34, wherein $K_2O$ is less than 5 mol. %.

A thirty-sixth aspect A36 includes the glass composition of any of the first through thirty-fifth aspects A1-A35, wherein the alkaline earth oxide comprises greater than or equal to 4 mol. % and less than or equal to 8 mol. % MgO and less than or equal to 1 mol. % of at least one of CaO, BaO, and SrO.

A thirty-seventh aspect A37 includes the glass composition of the thirty-sixth aspect A36, wherein the alkaline earth oxide comprises less than or equal to 0.5 mol. % CaO.

A thirty-eighth aspect A38 includes the glass composition of any of the first through thirty-seventh aspects A1-A37, further comprising greater than or equal to about 0.01 mol. % and less than or equal to 0.5 mol. % of a fining agent.

A thirty-ninth aspect A39 includes the glass composition of the thirty-eighth aspect A38, wherein the fining agent is $SnO_2$.

A fortieth aspect A40 includes the glass composition of any of the first through thirty-ninth aspects A1-A39, wherein the glass composition has an average coefficient of thermal expansion of less than or equal to $65 \times 10^{-7}$/° C. over a temperature range from about 20° C. to about 300° C.

A forty-first aspect A41 includes the glass composition of any of the first through fortieth aspects A1-A40, wherein the glass composition has an average coefficient of thermal expansion of less than or equal to $62 \times 10^{-7}$/° C. and greater than or equal to $50 \times 10^{-7}$/° C. over a temperature range from about 20° C. to about 300° C.

A forty-second aspect A42 includes the glass composition of any of the first through forty-first aspects A1-A41, wherein the glass composition has a hydrolytic resistance of class HGA 1 according to ISO 720:1985 before strengthening by ion exchange.

A forty-third aspect A43 includes the glass composition of the forty-second aspect A42, wherein the glass composition has a hydrolytic resistance of class HGA 1 according to ISO 720:1985 after strengthening by ion exchange.

A forty-fourth aspect A44 includes the glass composition of any of the first through forty-third aspects A1-A43, wherein the glass composition has a base resistance of class A1 or class A2 according to ISO 695:1991 before strengthening by ion exchange.

A forty-fifth aspect A45 includes the glass composition of the forty-fourth aspect A44, wherein the glass composition has a base resistance of class A1 or class A2 according to ISO 695:1991 after strengthening by ion exchange.

A forty-sixth aspect A46 includes the glass composition of any of the first through forty-fifth aspects A1-A45, wherein the glass composition has an acid resistance of class S2 or class S1 according to DIN 12116 (2001) before strengthening by ion exchange.

A forty-seventh aspect A47 includes the glass composition of the forty-sixth aspect A46, wherein the glass composition has an acid resistance of class S2 or class S1 according to DIN 12116 (2001) after strengthening by ion exchange.

A forty-eighth aspect A48 is a glass pharmaceutical package formed from the glass composition of any of the first through forty-seventh aspects A1-A47.

Additional features and advantages of the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of the aluminosilicate glass compositions that are chemically durable. According to one embodiment, a glass composition may include: greater than or equal to 71 mol. % and less than or equal to 83 mol. % $SiO_2$; greater than or equal to 1 mol. % and less than or equal to 11 mol. % $Al_2O_3$; greater than or equal to 5 mol. % and less than or equal to 18 mol. % alkali oxide, the alkali oxide comprising greater than 3 mol. % $Li_2O$ and at least one of $Na_2O$ and $K_2O$; greater than or equal to 1 mol. % and less than or equal to 8 mol. % alkaline earth oxide, the alkaline earth oxide comprising MgO and at least one of CaO, BaO, and SrO; and at least one of $TiO_2$, $ZrO_2$, $HfO_2$, $La_2O_3$ and $Y_2O_3$, wherein $TiO_2+ZrO_2+HfO_2+La_2O_3+Y_2O_3$ is greater than 0 mol. % and less than or equal to 6 mol. % and $Al_2O_3+TiO_2+ZrO_2+HfO_2+La_2O_3+Y_2O_3$ is greater than or equal to 2 mol. % and less than or equal to 12 mol. %. Various embodiments of the aluminosilicate glass compositions and the properties thereof will be described in further detail herein with reference to the illustrative examples.

The term "softening point," as used herein, refers to the temperature at which the viscosity of the glass composition is $1\times10^{7.6}$ poise.

The term "annealing point," as used herein, refers to the temperature at which the viscosity of the glass composition is $1\times10^{13}$ poise.

The terms "strain point" and "$T_{strain}$" as used herein, refers to the temperature at which the viscosity of the glass composition is $3\times10^{14}$ poise.

The term "liquidus temperature," as used herein, refers to the maximum temperature at which crystals can co-exist with molten glass in the glass melt in thermodynamic equilibrium.

The elastic modulus (also referred to as Young's modulus) of the glass composition is provided in units of gigapascals (GPa). The elastic modulus of the glass is determined by resonant ultrasound spectroscopy on bulk samples of each glass composition in accordance with ASTM C623.

The term "CTE," as used herein, refers to the coefficient of thermal expansion of the glass composition over a temperature range from about 20° C. to about 300° C.

Shear modulus is measured by resonant ultrasound spectroscopy in accordance with ASTM C623.

Strain and annealing points were measured according to the beam bending viscosity method which measures the viscosity of inorganic glass from $10^{12}$ to $10^{14}$ poise as a function of temperature in accordance to with ASTM C598.

Softening points were measured according to the parallel place viscosity method which measures the viscosity of inorganic glass from $10^7$ to $10^9$ poise as a function of temperature, similar to the ASTM C1351M.

Liquidus temperatures were measured with the gradient furnace method according to ASTM C829-81.

Compressive stress (including surface compressive stress) is measured with a surface stress meter (FSM) such as commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The phrase "depth of compression" and the acronym "DOC" refer to the position in the glass where compressive stress transitions to tensile stress.

In the embodiments of the glass compositions described herein, the concentrations of constituent components (e.g., $SiO_2$, $Al_2O_3$, and the like) are specified in mole percent (mol. %) on an oxide basis, unless otherwise specified.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.01 mol. %.

The term "chemical durability," as used herein, refers to the ability of the glass composition to resist degradation upon exposure to specified chemical conditions. Specifically, the chemical durability of the glass compositions described herein was assessed according to three established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; and ISO 720: 1985 entitled "Glass—Hydrolytic resistance of glass grains at 121 degrees C.—Method of test and classification." The chemical durability of the glass may also be assessed according to ISO 719:1985 "Glass—Hydrolytic resistance of glass grains at 98 degrees C.—Method of test and classification," in addition to the above referenced standards. The ISO 719 standard is a less rigorous version of the ISO 720 standard and, as such, it is believed that a glass which meets a specified classification of the ISO 720 standard will also meet the corresponding classification of the ISO 719 standard. The classifications associated with each standard are described in further detail herein.

The term "colorless," as used herein, means that a sample of the glass composition with a thickness of 10 mm has a transmittance in the visible portion of the electromagnetic spectrum (i.e., for wavelengths from 380 nm to 740 nm) is greater than 80%.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Aluminosilicate glasses have been investigated as an alternative to conventional Type 1B alumino-borosilicate glasses due the propensity of glasses containing boron constituents to delaminate. While aluminosilicate glasses have been identified which are resistant to delamination, have excellent chemical durability, and may be strengthened by ion exchange process, disclosed herein are aluminosilicate glasses which are resistant to delamination, may be strengthened by ion exchange, and in which the chemical durability is further enhanced through the addition of at least one of $TiO_2$, $ZrO_2$, $HfO_2$, $La_2O_3$, and $Y_2O_3$.

In the embodiments of the glass compositions described herein $SiO_2$ is the largest constituent of the composition and, as such, is the primary constituent of the resulting glass network. That is, $SiO_2$ is the primary network former. $SiO_2$ enhances the chemical durability of the glass and, in particular, the resistance of the glass composition to decomposition in acid and the resistance of the glass composition to decomposition in water. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass.

In the embodiments described herein, the glass compositions include $SiO_2$ in an amount greater than or equal 71 mol. % to enhance the chemical durability of the glass composition. The amount of $SiO_2$ may be less than or equal to 83 mol. % such that the glass composition may be readily melted and formed. Accordingly, in the embodiments described herein, the glass composition generally comprises $SiO_2$ in an amount greater than or equal to 71 mol. % and less than or equal to 83 mol. %. In embodiments, the lower bound of the amount of $SiO_2$ in the glass composition may be greater than or equal to 72 mol. %, greater than or equal to 73 mol. %, greater than or equal to 74 mol. %, greater than or equal to 75 mol. %, or even greater than or equal to 76 mol. %. In embodiments, the upper bound of the amount of $SiO_2$ in the glass composition may be less than or equal to 82 mol. %, less than or equal to 81 mol. %, less than or equal to 80 mol. % or even less than or equal to 79 mol. %. It should be understood that the amount of $SiO_2$ in the glass compositions may be within a range formed from any one of the lower bounds for $SiO_2$ and any one of the upper bounds of $SiO_2$ described herein.

For example and without limitation, in embodiments, the glass composition may include greater than or equal to 72 mol. % and less than or equal to 79 mol. % $SiO_2$. In embodiments, the glass composition may include greater than or equal to 73 mol. % and less than or equal to 79 mol. % $SiO_2$. In embodiments, the glass composition may include greater than or equal to 72 mol. % and less than or equal to 78 mol. % $SiO_2$. In embodiments, the glass composition may include greater than or equal to 73 mol. % and less than or equal to 78 mol. % $SiO_2$. In embodiments, the glass composition may include greater than or equal to 74 mol. % and less than or equal to 79 mol. % $SiO_2$. In embodiments, the glass composition may include greater than or equal to 74 mol. % and less than or equal to 78 mol. % $SiO_2$.

The glass compositions described herein may further include $Al_2O_3$. $Al_2O_3$ may act as both a network former and a modifier. For example, $Al_2O_3$, in conjunction with alkali oxides present in the glass composition, such as $Li_2O$, $Na_2O$, and/or $K_2O$, improves the susceptibility of the glass to ion exchange strengthening. Additions of $Al_2O_3$ to the glass composition also improve the chemical durability of the glass. However, if the amount of $Al_2O_3$ in the glass composition is too high, the resistance of the glass composition to acid attack is diminished. Further, if the amount of $Al_2O_3$ in the glass compositions is too high, the solubility of $La_2O_3$ and $ZrO_2$ in the glass may be diminished when such constituents are included in the glass.

In the embodiments described herein, the glass compositions include $Al_2O_3$ in a concentration greater than or equal 1 mol. % to enhance the ion exchangeability of the glass compositions. The concentration of $Al_2O_3$ is less than or equal to 11 mol. % such that the resistance of the glass composition to acid attack is not diminished. Accordingly, in the embodiments described herein, the glass compositions generally comprise $Al_2O_3$ in an amount greater than or equal to 1 mol. % and less than or equal to 11 mol. %. In embodiments, the lower bound of the amount of $Al_2O_3$ in the glass composition may be greater than or equal to 2 mol. %, greater than or equal to 3 mol. %, greater or equal to 4 mol. %, greater than or equal to 5 mol. %, or even greater than or equal to 6 mol. %. In embodiments, the upper bound of the amount of $Al_2O_3$ in the glass compositions may be less than or equal to 10 mol. %, less than or equal to 9 mol. %, or even less than or equal to 8 mol. %. It should be understood that the amount of $Al_2O_3$ in the glass compositions may be within a range formed from any one of the lower bounds for $Al_2O_3$ and any one of the upper bounds of $Al_2O_3$ described herein.

For example and without limitation, the glass compositions described herein may include $Al_2O_3$ in an amount greater than or equal to 2 mol. % and less than or equal to 8 mol. %. In embodiments, the amount of $Al_2O_3$ in the glass composition is greater than or equal to 4 mol. % and less than or equal to 8 mol. %. In some embodiments, the amount of $Al_2O_3$ in the glass composition is greater than or equal to 5 mol. % to less than or equal to 7 mol. %. In embodiments, the amount of $Al_2O_3$ in the glass composition is greater than or equal to 6 mol. % to less than or equal to 8 mol. %.

The glass compositions described herein also include alkali oxides such as $Li_2O$, $Na_2O$, and/or $K_2O$. The alkali oxides facilitate the ion exchangeability of the glass composition. The alkali oxides may also enhance other properties of the glass, as will be described in further detail herein. In the embodiments described herein, the glass compositions may include at least one alkali oxide, such as at least one of $Li_2O$, $Na_2O$, and/or $K_2O$. In some embodiments described herein, the alkali oxide may include $Li_2O$ and at least one of $Na_2O$ and $K_2O$. In some embodiments described herein, the amount of alkali oxide may be greater than 2 mol. % and less than or equal to 18 mol. %. In embodiments, the lower bound of the amount of alkali oxide in the glass composition may be greater than or equal to 2 mol. %, greater than or equal to 3 mol. %, greater or equal to 4 mol. %, greater than or equal to 5 mol. %, greater than or equal to 6 mol. %, greater than or equal to 7 mol. % or even greater than or equal to 8 mol. %. In embodiments, the upper bound of the amount of alkali oxide in the glass composition may be less than or equal to 18 mol. %, less than or equal to 17 mol. %, less than or equal to 16 mol. %, less than or equal to 15 mol. %, less than or equal to 14 mol. %, less than or equal to 13 mol. %, less than or equal to 12 mol. %, or even less than or equal to 11 mol. %. It should be understood that the amount of alkali oxide in the glass compositions may be within a range formed from any one of the lower bounds for alkali oxide and any one of the upper bounds of alkali oxide described herein.

For example and without limitation, the glass compositions described may include alkali oxide in an amount greater than or equal to 5 mol. % and less than or equal to 15 mol. %. In embodiments, the amount of alkali oxide in the glass composition is greater than or equal to 5 mol. % and less than or equal to 13 mol. %. In embodiments, the amount of alkali oxide in the glass composition is greater than or equal to 6 mol. % to less than or equal to 18 mol. %. In embodiments, the amount of alkali oxide in the glass composition is greater than or equal to 6 mol. % and less than or equal to 15 mol. %. In embodiments, the amount of alkali oxide in the glass composition is greater than or equal to 6 mol. % and less than or equal to 13 mol. %. In embodiments, the amount of alkali oxide in the glass composition is greater than or equal to 7 mol. % to less than or equal to 18 mol. %. In embodiments, the amount of alkali oxide in the glass composition is greater than or equal to 7 mol. % and less than or equal to 15 mol. %. In embodiments, the amount of alkali oxide in the glass composition is greater than or equal to 7 mol. % and less than or equal to 13 mol. %. In embodiments, the amount of alkali oxide in the glass composition is greater than or equal to 8 mol. % and less than or equal to 18 mol. %. In embodiments, the amount of alkali oxide in the glass composition is greater than or equal to 8 mol. % and less than or equal to 15 mol. %. In embodiments, the amount of alkali oxide in the glass composition is greater than or equal to 8 mol. % and less than or equal to 13 mol. %. In embodiments, the amount of alkali oxide in the glass composition is greater than or equal to 9 mol. % and less than or equal to 18 mol. %. In embodiments, the amount of alkali oxide in the glass composition is greater than or equal to 9 mol. % and less than or equal to 15 mol. %. In embodiments, the amount of alkali oxide in the glass composition is greater than or equal to 9 mol. % and less than or equal to 13 mol. %. In embodiments, the amount of alkali oxide in the glass composition is greater than or equal to 10 mol. % to less than or equal to 18 mol. %. In embodiments, the amount of alkali oxide in the glass composition is greater than or equal to 10 mol. % and less than or equal to 15 mol. %. In embodiments, the amount of alkali oxide in the glass composition is greater than or equal to 10 mol. % and less than or equal to 13 mol. %.

The glass compositions described herein include the alkali oxide $Li_2O$. $Li_2O$ provides a mechanism for strengthening the glass by ion exchange. In particular, additions of $Li_2O$ to the glass improve the kinetics of the ion exchange process, decreasing the ion exchange process time to achieve a desired surface compressive stress and depth of compression for a given ion exchange temperature. It is also believed that the amount of stored energy in the glass composition after ion exchange is greater due to the additions of $Li_2O$ in the glass composition. $Li_2O$ also enhances several other properties of the glass compositions. For example, additions of $Li_2O$ decrease the softening point of the glass which, in turn, improves the formability of the glass. This is particularly beneficial for glass compositions that include greater amounts of $SiO_2$ as the $Li_2O$ offsets the increase in the melting point of the glass due to the higher amounts of $SiO_2$.

Additions of $Li_2O$ also decrease the coefficient of thermal expansion of the glass composition. Decreasing the coefficient of thermal expansion improves the survivability of the glass to thermal cycling or thermal stress conditions compared to glass compositions with relatively higher coefficients of thermal expansion. Finally, additions of $Li_2O$ improve the hydrolytic resistance of the glass thereby providing for a more chemically durable glass.

$Li_2O$ may be present in the glass compositions in an amount greater than 0 mol. %, such as greater than or equal to 3 mol. %. In embodiments, $Li_2O$ may be present in the glass compositions in an amount greater than or equal to 3 mol. % and less than or equal to 10 mol. %. In embodiments, the lower bound of the amount of $Li_2O$ in the glass composition may be greater than or equal to 4 mol. %, greater than or equal to 5 mol. %, or even greater than or equal to 6 mol. %. In embodiments, the upper bound of the amount of $Na_2O$ in the glass composition may be less than or equal to 9 mol. %, less than or equal to 8 mol. %, less than or equal to 7 mol. %, less than or equal to 6 mol. %, less than or equal to 5 mol. %, or even less than or equal to 4 mol. %. It should be understood that the amount of $Li_2O$ in the glass compositions may be within a range formed from any one of the lower bounds for $Li_2O$ and any one of the upper bounds of $Li_2O$ described herein.

For example and without limitation, the glass compositions described herein may include $Li_2O$ in an amount greater than or equal to 3 mol. % and less than or equal to 9 mol. %. In embodiments, the amount of $Li_2O$ in the glass composition is greater than or equal to 3 mol. % and less than or equal to 8 mol. %. In some embodiments, the amount of $Li_2O$ in the glass composition is greater than or equal to 4 mol. % and less than or equal to 10 mol. %. In embodiments, the amount of $Li_2O$ in the glass composition is greater than or equal to 4 mol. % and less than or equal to 9 mol. %. In embodiments, the amount of $Li_2O$ in the glass composition is greater than or equal to 4 mol. % and less than or equal to 8 mol. %. In embodiments, the amount of $Li_2O$ in the glass composition is greater than or equal to 5 mol. % and less than or equal to 10 mol. %. In embodiments, the amount of $Li_2O$ in the glass composition is greater than or equal to 5 mol. % and less than or equal to 9 mol. %. In embodiments, the amount of $Li_2O$ in the glass composition is greater than or equal to 5 mol. % and less than or equal to 8 mol. %.

The alkali oxide $Na_2O$, when included, enhances the ion exchangeability of the glass composition and improves the meltability of the glass composition. If the amount of $Na_2O$ is too low, the liquidus temperature of the glass composition may increase making the glass composition difficult to melt. However, if the concentration of $Na_2O$ is too high, the chemical durability of the glass composition decreases. In embodiments where the alkali oxide includes $Na_2O$, the $Na_2O$ may be present in the glass composition in an amount greater than 0 mol. %, such as greater than or equal to 0.5 mol. %, and less than or equal to 13 mol. %. In embodiments, the lower bound of the amount of $Na_2O$ in the glass composition may be greater than or equal to 1 mol. %, greater than or equal to 1.25 mol. %, greater or equal to 1.5 mol. %, greater than or equal to 1.75 mol. %, greater than or equal to 2.0 mol. %, greater than or equal to 2.25 mol. %, greater than or equal to 2.5 mol. %, greater than or equal to 2.75 mol. %, greater than or equal to 3 mol. %, greater than or equal to 3.25 mol. %, greater than or equal to 3.5 mol. %, or even greater than or equal to 3.75 mol. %. In embodiments, the upper bound of the amount of $Na_2O$ in the glass composition may be less than or equal to 12 mol. %, less than or equal to 11 mol. %, less than or equal to 10 mol. %, less than or equal to 9 mol. %, less than or equal to 8 mol. %, less than or equal to 7 mol. %, less than or equal to 6 mol. %, less than or equal to 5 mol. %, less than or equal to 4 mol. %, less than or equal to 3 mol. %, less than or equal to 2.5 mol. %, or even less than or equal to 2 mol. %. It should be understood that the amount of $Na_2O$ in the glass compositions may be within a range formed from any one of the lower bounds for $Na_2O$ and any one of the upper bounds of $Na_2O$ described herein.

For example and without limitation, the glass compositions described herein may include $Na_2O$ in an amount greater than or equal to 1 mol. % and less than or equal to 12 mol. %. In embodiments, the amount of $Na_2O$ in the glass composition is greater than or equal to 1 mol. % and less than or equal to 11 mol. %. In embodiments, the amount of $Na_2O$ in the glass composition is greater than or equal to 1 mol. % and less than or equal to 10 mol. %. In embodiments, the amount of $Na_2O$ in the glass composition is greater than or equal to 1 mol. % and less than or equal to 9 mol. %. In embodiments, the amount of $Na_2O$ in the glass composition is greater than or equal to 1 mol. % and less than or equal to 8 mol. %. In embodiments, the amount of $Na_2O$ in the glass composition is greater than or equal to 1 mol. % and less than or equal to 7 mol. %. In embodiments, the amount of $Na_2O$ in the glass composition is greater than or equal to 1 mol. % and less than or equal to 6 mol. %. In embodiments, the amount of $Na_2O$ in the glass composition is greater than or equal to 1 mol. % and less than or equal to 5 mol. %. In embodiments, the amount of $Na_2O$ in the glass composition is greater than or equal to 1 mol. % and less than or equal to 4 mol. %. In embodiments, the amount of $Na_2O$ in the glass composition is greater than or equal to 1 mol. % and less than or equal to 3 mol. %. In embodiments, the amount of $Na_2O$ in the glass composition is greater than or equal to 1 mol. % and less than or equal to 2.5 mol. %. In embodiments, the amount of $Na_2O$ in the glass composition is greater than or equal to 1 mol. % to less than or equal to 2.0 mol. %.

As noted above, the alkali oxide in the glass compositions may further include $K_2O$. Like $Na_2O$, the amount of $K_2O$ present in the glass compositions relates to the ion exchangeability of the glass composition and the meltability of the glass. Specifically, as the amount of $K_2O$ present in the glass composition increases, the compressive stress obtainable through ion exchange decreases. In addition, if the amount of $K_2O$ is too high, the glass composition is difficult to melt. Accordingly, it is desirable to limit the amount of $K_2O$ present in the glass composition.

In embodiments where the alkali oxide includes $K_2O$, the $K_2O$ may be present in the glass composition in an amount greater than 0 mol. %, such as greater than or equal to 0.5 mol. %, and less than or equal to 10 mol. %. In embodiments, the lower bound of the amount of $K_2O$ in the glass composition may be greater than or equal to 1 mol. %, greater than or equal to 1.25 mol. %, greater or equal to 1.5 mol. %, greater than or equal to 1.75 mol. %, greater than or equal to 2.0 mol. %, greater than or equal to 2.25 mol. %, greater than or equal to 2.5 mol. %, greater than or equal to 2.75 mol. %, greater than or equal to 3 mol. %, greater than or equal to 3.25 mol. %, greater than or equal to 3.5 mol. %, or even greater than or equal to 3.75 mol. %. In embodiments, the upper bound of the amount of $K_2O$ in the glass composition may be less than or equal to 10 mol. %, less than or equal to 9 mol. %, less than or equal to 8 mol. %, less than or equal to 7 mol. %, less than or equal to 6 mol. %, less than or equal to 5 mol. %, less than or equal to 4 mol. %, less than or equal to 3 mol. %, less than or equal to 2.5 mol. %, or even less than or equal to 2 mol. %. It should be understood that the amount of $K_2O$ in the glass compositions may be within a range formed from any one of the lower bounds for $K_2O$ and any one of the upper bounds of $K_2O$ described herein.

For example and without limitation, the glass compositions described herein may include $K_2O$ in an amount greater than or equal to 1 mol. % to less than or equal to 9 mol. %. In embodiments, the amount of $K_2O$ in the glass composition is greater than or equal to 1 mol. % and less than or equal to 8 mol. %. In embodiments, the amount of $K_2O$ in the glass composition is greater than or equal to 1 mol. % and less than or equal to 7 mol. %. In embodiments, the amount of $K_2O$ in the glass composition is greater than or equal to 1 mol. % and less than or equal to 6 mol. %. In embodiments, the amount of $K_2O$ in the glass composition is greater than or equal to 1 mol. % and less than or equal to 5 mol. %. In embodiments, the amount of $K_2O$ in the glass composition is greater than or equal to 1 mol. % and less than or equal to 4 mol. %. In embodiments, the amount of $K_2O$ in the glass composition is greater than or equal to 1 mol. % and less than or equal to 3 mol. %. In embodiments, the amount of $K_2O$ in the glass composition is greater than or equal to 1 mol. % and less than or equal to 2.5 mol. %. In embodiments, the amount of $K_2O$ in the glass composition is greater than or equal to 1 mol. % and less than or equal to 2.0 mol. %.

In embodiments wherein the glass composition is used to form a glass article which will be subsequently strengthened by ion exchange, the amount of $Li_2O$ in the glass article is greater than the amount of $Na_2O$ present in the glass article and greater than the amount of $K_2O$ present in the glass article. Similarly, the amount of $Na_2O$ in the glass article is greater than the amount of $K_2O$ present in the glass article. For example, where the glass article comprises $Li_2O$, $Na_2O$, and $K_2O$, $Li_2O$ (mol. %)>$Na_2O$ (mol. %)>$K_2O$ (mol. %); where the glass article comprises $Li_2O$ and $Na_2O$, $Li_2O$ (mol. %)>$Na_2O$ (mol. %); and where the glass article comprises $Li_2O$ and $K_2O$, $Li_2O$ (mol. %)>$K_2O$ (mol. %).

Alkaline earth oxides, such as MgO, CaO, BaO, and SrO, may be present in the glass compositions to improve the meltability of the glass batch materials and increase the chemical durability of the glass compositions. In the glass compositions described herein, the total amount (mol. %) of alkaline earth oxides present in the glass compositions are generally less than the total amount (mol. %) of alkali oxides present in the glass compositions in order to improve the ion exchangeability of the glass compositions. In the glass compositions described herein, the alkaline earth oxides may include MgO and at least one of CaO, BaO, and SrO.

In some embodiments described herein, the amount of alkaline earth oxide may be greater than or equal to 1 mol. % and less than or equal to 8 mol. %. In embodiments, the lower bound of the amount of alkaline earth oxide in the glass compositions may be greater than or equal to 2 mol. %, greater than or equal to 3 mol. %, greater or equal to 4 mol. %, or even greater than or equal to 5 mol. %, or even greater than or equal to 6 mol. %. In embodiments, the upper bound of the amount of alkaline earth oxide in the glass composition may be less than or equal to 8 mol. %, less than or equal to 7 mol. %, less than or equal to 6 mol. %, or even less than or equal to 5 mol. %. It should be understood that the amount of alkaline earth oxide in the glass compositions may be within a range formed from any one of the lower bounds for alkaline earth oxide and any one of the upper bounds of alkaline earth oxide described herein.

For example and without limitation, the glass compositions described may include alkaline earth oxide in an amount greater than or equal to 2 mol. % and less than or equal to 8 mol. %. In embodiments, the glass compositions described herein may include greater than or equal to 3 mol. % and less than or equal to 8 mol. % alkaline earth oxide. In embodiments, the glass compositions described herein may include greater than or equal to 4 mol. % and less than or equal to 8 mol. % alkaline earth oxide. In embodiments, the glass compositions described herein may include greater than or equal to 5 mol. % and less than or equal to 8 mol. % alkaline earth oxide. In embodiments, the glass compositions described herein may include greater than or equal to 4 mol. % and less than or equal to 7 mol. % alkaline earth oxide. In embodiments, the glass compositions described herein may include greater than or equal to 4 mol. % and less than or equal to 6 mol. % alkaline earth oxide. In embodiments, the glass compositions described herein may include greater than or equal to 4 mol. % and less than or equal to 5 mol. % alkaline earth oxide.

In the embodiments described herein, the alkaline earth oxide in the glass composition includes MgO. In addition to improving the formability and the meltability of the glass composition, MgO may also improve the ion exchange performance of the glass composition. MgO also improves the solubility of $La_2O_3$ and $ZrO_2$ when such constituents are included in the glass composition.

In some embodiments described herein, the amount of MgO in the glass composition may be greater than or equal to 1 mol. % and less than or equal to 8 mol. %. In embodiments, the lower bound of the amount of MgO in the glass composition may be greater than or equal to 2 mol. %, greater than or equal to 3 mol. %, greater or equal to 4 mol. %, greater than or equal to 5 mol. %, or even greater than or equal to 6 mol. %. In embodiments, the upper bound of the amount of MgO in the glass composition may be less than or equal to 7 mol. %, less than or equal to 6 mol. %, or even less than or equal to 5 mol. %. It should be understood that the amount of MgO in the glass compositions may be within a range formed from any one of the lower bounds for MgO and any one of the upper bounds of MgO described herein.

For example and without limitation, the glass compositions described may include MgO in an amount greater than or equal to 2 mol. % and less than or equal to 8 mol. %. In embodiments, the glass compositions described herein may include greater than or equal to 3 mol. % and less than or equal to 8 mol. % MgO. In embodiments, the glass compositions described herein may include greater than or equal to 4 mol. % and less than or equal to 8 mol. % MgO. In embodiments, the glass compositions described herein may include greater than or equal to 2 mol. % and less than or equal to 7 mol. % MgO. In embodiments, the glass compositions described herein may include greater than or equal to 2 mol. % and less than or equal to 6 mol. % MgO. In embodiments, the glass compositions described herein may include greater than or equal to 2 mol. % and less than or equal to 5 mol. % MgO.

In the embodiments described herein, the alkaline earth oxide in the glass compositions may include at least one of CaO, BaO, and SrO in addition to MgO. CaO, BaO, and SrO improve the formability of the glass composition and also improve the chemical durability of the glass composition.

In some embodiments described herein, the total amount of CaO, BaO, and SrO in the glass composition (i.e., CaO (mol. %)+BaO (mol. %)+SrO (mol. %)) in the glass composition may be greater than or equal to 0.10 mol. % and less than or equal to 2 mol. %. In embodiments, the lower bound of the total amount of CaO, BaO, and SrO in the glass composition may be greater than or equal to 0.15 mol. %, greater than or equal to 0.20 mol. %, greater or equal to 0.25 mol. %, greater than or equal to 0.30 mol. %, greater than or equal to 0.35 mol. %, greater than or equal to 0.40 mol. %, greater than or equal to 0.45 mol. %, or even greater than or equal to 0.50 mol. %. In embodiments, the upper bound of the total amount of CaO, BaO, and SrO in the glass composition may be less than or equal to 2 mol. %, less than or equal to 1.75 mol. %, less than or equal to 1.5 mol. %, less than or equal to 1.25 mol. %, less than or equal to 1.0 mol. %, or even less than or equal to 0.75 mol. %. It should be understood that the total amount of CaO, BaO, and SrO in the glass compositions may be within a range formed from any one of the lower bounds for the total amount of CaO, BaO, and SrO and any one of the upper bounds for the total amount of CaO, BaO, and SrO described herein.

For example and without limitation, the total amount of CaO, BaO, and SrO in the glass compositions described may be greater than or equal to 0.10 mol. % and less than or equal to 1.5 mol. %. In embodiments, the total amount of CaO, BaO, and SrO in the glass compositions described herein may be greater than or equal to 0.10 mol. % and less than or equal to 1.25 mol. %. In embodiments, the total amount of CaO, BaO, and SrO in the glass compositions described herein may be greater than or equal to 0.10 mol. % and less than or equal to 1.0 mol. %. In embodiments, the total amount of CaO, BaO, and SrO in the glass compositions described herein may be greater than or equal to 0.10 mol. % and less than or equal to 0.75 mol. %.

In the embodiments described herein, the glass compositions are generally rich in MgO, (i.e., the concentration of MgO in the glass composition is greater than the total concentration of the other alkaline earth oxides in the glass composition). Forming the glass composition such that the glass composition is MgO-rich improves the hydrolytic resistance of the resultant glass. Moreover, glass compositions which are MgO-rich generally exhibit improved ion exchange performance relative to glass compositions which are rich in other alkaline earth oxides. Specifically, glasses formed from MgO-rich glass compositions generally have a greater diffusivity than glass compositions which are rich in other alkaline earth oxides. The greater diffusivity enables the formation of a deeper depth of layer in the glass. MgO-rich glass compositions also enable a higher compressive stress to be achieved in the surface of the glass compared to glass compositions which are rich in other alkaline earth oxides such as CaO, BaO, and SrO, or combinations thereof. In addition, it is generally understood that as the ion exchange process proceeds and alkali ions penetrate more deeply into the glass, the maximum compressive stress achieved at the surface of the glass may decrease with time. However, glasses formed from glass compositions which are MgO-rich exhibit a lower reduction in compressive stress than glasses formed from glass compositions that are rich in other alkaline earth oxides or combinations of other alkaline earth oxides (i.e., glasses which are MgO-poor). Thus, MgO-rich glass compositions enable higher compressive stress at the surface and greater depths of compression than glasses which are rich in other alkaline earth oxides or combinations of other alkaline earth oxides.

In order to fully realize the benefits of MgO in the glass compositions described herein, it has been determined that the ratio of the total concentration of CaO, BaO, and SrO to the sum of the concentration of CaO, BaO, and SrO and the concentration of MgO in mol. % (i.e., ((CaO+BaO+SrO)/

(CaO+BaO+SrO+MgO)) should be minimized. Specifically, it has been determined that (CaO+BaO+SrO)/(CaO+BaO+SrO+MgO) should be less than or equal to 0.5. In some embodiments (CaO+BaO+SrO)/(CaO+BaO+SrO+MgO) is less than or equal to 0.3 or even less than or equal to 0.2. In some other embodiments (CaO+BaO+SrO)/(CaO+BaO+SrO+MgO) may even be less than or equal to 0.1.

The glass compositions described herein may comprise one or more additional metal oxides to further improve the chemical durability of the glass composition. Specifically, it has been found that additions of one or more of $TiO_2$, $ZrO_2$, $HfO_2$, $La_2O_3$, and $Y_2O_3$ may further increase the chemical durability of the glass composition resulting in glass compositions which have good chemical durability before ion exchange strengthening, particularly with respect to the chemical durability of the glass in basic solutions. It has also been found that additions $TiO_2$, $ZrO_2$, $HfO_2$, $La_2O_3$, and $Y_2O_3$ beneficially decrease the average coefficient of thermal expansion of the glass composition.

Without wishing to be bound by theory, it is believed that the addition of one or more of $TiO_2$, $ZrO_2$, $HfO_2$, $La_2O_3$, and $Y_2O_3$ improves the properties of the glass by enhancing the functionality of $Al_2O_3$ in the glass composition. As noted herein, additions of $Al_2O_3$ to the glass composition improve the susceptibility of the glass to ion exchange strengthening and also improve the chemical durability of the glass. With respect to the chemical durability, it is believed that additions of $Al_2O_3$ to the glass composition reduce the amount of non-bridging oxygen in the glass composition which, in turn, improves the chemical durability of the glass. However, it has been found that if the amount of $Al_2O_3$ in the glass composition is too high, the resistance of the glass composition to acid attack is diminished. It has now been found that including one or more of $TiO_2$, $ZrO_2$, $HfO_2$, $La_2O_3$, and $Y_2O_3$, in addition to $Al_2O_3$, further reduces the amount of non-bridging oxygen in the glass composition which, in turn, further improves the chemical durability of the glass beyond that achievable by additions of $Al_2O_3$ alone.

The glass compositions described herein include at least one of $TiO_2$, $ZrO_2$, $HfO_2$, $La_2O_3$, and $Y_2O_3$ to further enhance the chemical durability of the glass composition. In embodiments, the total amount of $TiO_2$, $ZrO_2$, $HfO_2$, $La_2O_3$, and $Y_2O_3$ (i.e., $TiO_2$ (mol. %)+$ZrO_2$ (mol. %)+$HfO_2$ (mol. %)+$La_2O_3$ (mol. %)+$Y_2O_3$ (mol. %)) in the glass composition is greater than 0 mol. % and less than or equal to 6 mol. %. In embodiments, the lower bound of the total amount of $TiO_2$, $ZrO_2$, $HfO_2$, $La_2O_3$, and $Y_2O_3$ in the glass composition may be greater than or equal to 0.25 mol. %, greater than or equal to 0.30 mol. %, greater or equal to 0.35 mol. %, greater than or equal to 0.40 mol. %, greater than or equal to 0.45 mol. %, greater than or equal to 0.50 mol. %, greater than or equal to 0.55 mol. %, greater than or equal to 0.60 mol. %, greater than or equal to 0.65 mol. %, greater than or equal to 0.70 mol. %, greater than or equal to 0.75 mol. %, greater than or equal to 0.80 mol. %, greater than or equal to 0.85 mol. %, greater than or equal to 0.90 mol. %, greater than or equal to 0.95 mol. %, or even greater than or equal to 1.0 mol. %. In embodiments, the upper bound of the total amount of $TiO_2$, $ZrO_2$, $HfO_2$, $La_2O_3$, and $Y_2O_3$ in the glass composition may be less than or equal to 5 mol. %, less than or equal to 4.5 mol. %, less than or equal to 4.0 mol. %, less than or equal to 3.5 mol. %, less than or equal to 3.0 mol. %, less than or equal to 2.5 mol. %, or even less than or equal to 2.0 mol. %. It should be understood that the total amount of $TiO_2$, $ZrO_2$, $HfO_2$, $La_2O_3$, and $Y_2O_3$ in the glass compositions may be within a range formed from any one of the lower bounds for the total amount of $TiO_2$, $ZrO_2$, $HfO_2$, $La_2O_3$, and $Y_2O_3$ and any one of the upper bounds for the total amount of $TiO_2$, $ZrO_2$, $HfO_2$, $La_2O_3$, and $Y_2O_3$ described herein.

For example and without limitation, the total amount of $TiO_2$, $ZrO_2$, $HfO_2$, $La_2O_3$, and $Y_2O_3$ in the glass compositions described may be greater than or equal to 0.30 mol. % and less than or equal to 6 mol. %. While it has been found that additions of $TiO_2$, $ZrO_2$, $HfO_2$, $La_2O_3$, and/or $Y_2O_3$ to the glass composition may improve the chemical durability of the glass composition, it has also been found that concentrations of $TiO_2$, $ZrO_2$, $HfO_2$, $La_2O_3$, and $Y_2O_3$ which exceed 6 mol. %, either individually or collectively, may diminish the formability and the acid resistance of the glass. Accordingly, in embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 5.5 mol. %. In embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 5.0 mol. %. In embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 4.5 mol. %. In embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 3.0 mol. %. In embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 2.5 mol. %. In embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 2.0 mol. %. In embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 1.5 mol. %. In embodiments, the total amount of $TiO_2$, $ZrO_2$, $HfO_2$, $La_2O_3$, and $Y_2O_3$ in the glass compositions described herein may be greater than or equal to 0.30 mol. % and less than or equal to 1.0 mol. %.

In embodiments, the glass compositions may optionally include $TiO_2$. It has been found that additions of $TiO_2$ to the glass composition improve the hydrolytic resistance of the glass composition while also improving the ion exchange performance of the glass. In embodiments of the glass composition which include $TiO_2$, $TiO_2$ may be present in the glass composition in an amount greater than or equal to 0.01 mol. %, greater than or equal to 0.1 mol. %, greater than or equal to 0.2 mol. %, greater than or equal to 0.3 mol. %, greater than or equal to 0.4 mol. %, greater than or equal to 0.5 mol. %, greater than or equal to 0.6 mol. %, greater than or equal to 0.7 mol. %, greater than or equal to 0.8 mol. %, greater than or equal to 0.9 mol. %, greater or equal to 1.0 mol. %, greater than or equal to 1.5 mol. %, or even greater than or equal to 2 mol. %. In embodiments, the upper bound of the amount of $TiO_2$ in the glass composition may be less than or equal to 6.0 mol. %, less than or equal to 5.75 mol. %, less than or equal to 5.5 mol. %, less than or equal to 5 mol. %, less than or equal to 4.5 mol. %, less than or equal to 4.0 mol. %, less than or equal to 3.5 mol. %, less than or equal to 3.0 mol. %, less than or equal to 2.5 mol. %, or even less than or equal to 2.0 mol. %. It should be understood that the amount of $TiO_2$ in the glass compositions may be within a range formed from any one of the lower bounds for $TiO_2$ and any one of the upper bounds of $TiO_2$ described herein.

For example and without limitation, the glass compositions described may include $TiO_2$ in an amount greater than or equal to 0.01 mol. % and less than or equal to 5.5 mol. %. In embodiments, the glass compositions described herein may include greater than or equal to 0.01 mol. % and less than or equal to 5.0 mol. % $TiO_2$. In embodiments, the glass compositions described herein may include greater than or equal to 0.01 mol. % and less than or equal to 4.5 mol. % $TiO_2$. In embodiments, the glass compositions described herein may include greater than or equal to 0.01 mol. % and less than or equal to 4.0 mol. % $TiO_2$. In embodiments, the glass compositions described herein may include greater than or equal to 0.01 mol. % and less than or equal to 3.5 mol. % $TiO_2$. In embodiments, the glass compositions described herein may include greater than or equal to 0.01 mol. % and less than or equal to 3.0 mol. % $TiO_2$. In embodiments, the glass compositions described herein may include greater than or equal to 0.01 mol. % and less than or equal to 2.5 mol. % $TiO_2$. In embodiments, the glass compositions described herein may include greater than or equal to 0.01 mol. % and less than or equal to 2.0 mol. % $TiO_2$. In embodiments, the glass compositions described herein may include greater than or equal to 1.0 mol. % and less than or equal to 6.0 mol. % $TiO_2$. In embodiments, the glass compositions described herein may include greater than or equal to 1.0 mol. % and less than or equal to 5.5 mol. % $TiO_2$. In embodiments, the glass compositions described herein may include greater than or equal to 1.0 mol. % and less than or equal to 5.0 mol. % $TiO_2$. In embodiments, the glass compositions described herein may include greater than or equal to 1.0 mol. % and less than or equal to 4.5 mol. % $TiO_2$. In embodiments, the glass compositions described herein may include greater than or equal to 1.0 mol. % and less than or equal to 3.0 mol. % $TiO_2$. In embodiments, the glass compositions described herein may include greater than or equal to 1.0 mol. % and less than or equal to 2.5 mol. % $TiO_2$. In embodiments, the glass compositions described herein may include greater than or equal to 1.0 mol. % and less than or equal to 2.0 mol. % $TiO_2$.

Additions of $ZrO_2$ to the glass composition improve the base resistance of the glass composition without imparting a color to the glass composition (i.e., additions of $ZrO_2$ aid in maintaining the glass as "colorless" as determined by the transmittance of the glass). In embodiments of the glass composition which include $ZrO_2$, the $ZrO_2$ may be present in the glass composition in an amount greater than or equal to 0.01 mol. % and less than or equal to 6 mol. %. In embodiments, the lower bound of the amount of $ZrO_2$ in the glass composition may be greater than or equal to 0.01 mol. %, greater than or equal to 0.1 mol. %, greater than or equal to 0.2 mol. %, greater than or equal to 0.3 mol. %, greater than or equal to 0.4 mol. %, greater than or equal to 0.5 mol. %, greater than or equal to 0.6 mol. %, greater than or equal to 0.7 mol. %, greater than or equal to 0.8 mol. %, greater than or equal to 0.9 mol. %, greater or equal to 1.0 mol. %, greater than or equal to 1.5 mol. %, or even greater than or equal to 2 mol. %. In embodiments, the upper bound of the amount of $ZrO_2$ in the glass composition may be less than or equal to 6.0 mol. %, less than or equal to 5.75 mol. %, less than or equal to 5.5 mol. %, less than or equal to 5 mol. %, less than or equal to 4.5 mol. %, less than or equal to 4.0 mol. %, less than or equal to 3.5 mol. %, less than or equal to 3.0 mol. %, less than or equal to 2.5 mol. %, or even less than or equal to 2.0 mol. %. It should be understood that the amount of $ZrO_2$ in the glass compositions may be within a range formed from any one of the lower bounds for $ZrO_2$ and any one of the upper bounds of $ZrO_2$ described herein.

For example and without limitation, the glass compositions described may include $ZrO_2$ in an amount greater than or equal to 0.01 mol. % and less than or equal to 5.5 mol. %. In embodiments, the glass compositions described herein may include greater than or equal to 0.01 mol. % and less than or equal to 5.0 mol. % $ZrO_2$. In embodiments, the glass compositions described herein may include greater than or equal to 0.01 mol. % and less than or equal to 4.5 mol. % $ZrO_2$. In embodiments, the glass compositions described herein may include greater than or equal to 0.01 mol. % and less than or equal to 4.0 mol. % $ZrO_2$. In embodiments, the glass compositions described herein may include greater than or equal to 0.01 mol. % and less than or equal to 3.5 mol. % $ZrO_2$. In embodiments, the glass compositions described herein may include greater than or equal to 0.01 mol. % and less than or equal to 3.0 mol. % $ZrO_2$. In embodiments, the glass compositions described herein may include greater than or equal to 0.01 mol. % and less than or equal to 2.5 mol. % $ZrO_2$. In embodiments, the glass compositions described herein may include greater than or equal to 0.01 mol. % and less than or equal to 2.0 mol. % $ZrO_2$. In embodiments, the glass compositions described herein may include greater than or equal to 1.0 mol. % and less than or equal to 6.0 mol. % $ZrO_2$. In embodiments, the glass compositions described herein may include greater than or equal to 1.0 mol. % and less than or equal to 5.5 mol. % $ZrO_2$. In embodiments, the glass compositions described herein may include greater than or equal to 1.0 mol. % and less than or equal to 5.0 mol. % $ZrO_2$. In embodiments, the glass compositions described herein may include greater than or equal to 1.0 mol. % and less than or equal to 4.5 mol. % $ZrO_2$. In embodiments, the glass compositions described herein may include greater than or equal to 1.0 mol. % and less than or equal to 3.0 mol. % $ZrO_2$. In embodiments, the glass compositions described herein may include greater than or equal to 1.0 mol. % and less than or equal to 2.5 mol. % $ZrO_2$. In embodiments, the glass compositions described herein may include greater than or equal to 1.0 mol. % and less than or equal to 2.0 mol. % $ZrO_2$.

Like $ZrO_2$, additions of $HfO_2$ to the glass composition also improve the base resistance of the glass composition without imparting a color to the glass composition. In embodiments of the glass composition which include $HfO_2$, the $HfO_2$ may be present in the glass composition in an amount greater than or equal to 0.01 mol. % and less than or equal to 6 mol. %. In embodiments, the lower bound of the amount of $HfO_2$ in the glass composition may be greater than or equal to 0.01 mol. %, greater than or equal to 0.1 mol. %, greater than or equal to 0.2 mol. %, greater than or equal to 0.3 mol. %, greater than or equal to 0.4 mol. %, greater than or equal to 0.5 mol. %, greater than or equal to 0.6 mol. %, greater than or equal to 0.7 mol. %, greater than or equal to 0.8 mol. %, greater than or equal to 0.9 mol. %, greater or equal to 1.0 mol. %, greater than or equal to 1.5 mol. %, or even greater than or equal to 2 mol. %. In embodiments, the upper bound of the amount of $HfO_2$ in the glass composition may be less than or equal to 6.0 mol. %, less than or equal to 5.75 mol. %, less than or equal to 5.5 mol. %, less than or equal to 5 mol. %, less than or equal to 4.5 mol. %, less than or equal to 4.0 mol. %, less than or equal to 3.5 mol. %, less than or equal to 3.0 mol. %, less than or equal to 2.5 mol. %, or even less than or equal to 2.0 mol. %. It should be understood that the amount of $HfO_2$ in the glass compositions may be within a range formed from any one of the lower bounds for $HfO_2$ and any one of the upper bounds of $HfO_2$ described herein.

For example and without limitation, the glass compositions described may include $HfO_2$ in an amount greater than or equal to 0.01 mol. % and less than or equal to 5.5 mol. %. In embodiments, the glass compositions described herein may include greater than or equal to 0.01 mol. % and less than or equal to 5.0 mol. % $HfO_2$. In embodiments, the glass compositions described herein may include greater than or equal to 0.01 mol. % and less than or equal to 4.5 mol. % $HfO_2$. In embodiments, the glass compositions described herein may include greater than or equal to 0.01 mol. % and less than or equal to 4.0 mol. % $HfO_2$. In embodiments, the glass compositions described herein may include greater than or equal to 0.01 mol. % and less than or equal to 3.5 mol. % $HfO_2$. In embodiments, the glass compositions described herein may include greater than or equal to 0.01 mol. % and less than or equal to 3.0 mol. % $HfO_2$. In embodiments, the glass compositions described herein may include greater than or equal to 0.01 mol. % and less than or equal to 2.5 mol. % $HfO_2$. In embodiments, the glass compositions described herein may include greater than or equal to 0.01 mol. % and less than or equal to 2.0 mol. % $HfO_2$. In embodiments, the glass compositions described herein may include greater than or equal to 1.0 mol. % and less than or equal to 6.0 mol. % $HfO_2$. In embodiments, the glass compositions described herein may include greater than or equal to 1.0 mol. % and less than or equal to 5.5 mol. % $HfO_2$. In embodiments, the glass compositions described herein may include greater than or equal to 1.0 mol. % and less than or equal to 5.0 mol. % $HfO_2$. In embodiments, the glass compositions described herein may include greater than or equal to 1.0 mol. % and less than or equal to 4.5 mol. % $HfO_2$. In embodiments, the glass compositions described herein may include greater than or equal to 1.0 mol. % and less than or equal to 3.0 mol. % $HfO_2$. In embodiments, the glass compositions described herein may include greater than or equal to 1.0 mol. % and less than or equal to 2.5 mol. % $HfO_2$. In embodiments, the glass compositions described herein may include greater than or equal to 1.0 mol. % and less than or equal to 2.0 mol. % $HfO_2$.

Additions of $La_2O_3$ to the glass composition improve the hydrolytic resistance of the glass composition. In embodiments of the glass composition which include $La_2O_3$, the $La_2O_3$ may be present in the glass composition in an amount greater than or equal to 0.01 mol. % and less than or equal to 6 mol. %. In embodiments, the lower bound of the amount of $La_2O_3$ in the glass composition may be greater than or equal to 0.01 mol. %, greater than or equal to 0.1 mol. %, greater than or equal to 0.2 mol. %, greater than or equal to 0.3 mol. %, greater than or equal to 0.4 mol. %, greater than or equal to 0.5 mol. %, greater than or equal to 0.6 mol. %, greater than or equal to 0.7 mol. %, greater than or equal to 0.8 mol. %, greater than or equal to 0.9 mol. %, greater or equal to 1.0 mol. %, greater than or equal to 1.5 mol. %, or even greater than or equal to 2 mol. %. In embodiments, the upper bound of the amount of $La_2O_3$ in the glass composition may be less than or equal to 6.0 mol. %, less than or equal to 5.75 mol. %, less than or equal to 5.5 mol. %, less than or equal to 5 mol. %, less than or equal to 4.5 mol. %, less than or equal to 4.0 mol. %, less than or equal to 3.5 mol. %, less than or equal to 3.0 mol. %, less than or equal to 2.5 mol. %, less than or equal to 2.0 mol. %, less than or equal to 1.5 mol. %, or even less than or equal to 1.0 mol. %. It should be understood that the amount of $La_2O_3$ in the glass compositions may be within a range formed from any one of the lower bounds for $La_2O_3$ and any one of the upper bounds of $La_2O_3$ described herein.

For example and without limitation, the glass compositions described may include $La_2O_3$ in an amount greater than or equal to 0.01 mol. % and less than or equal to 5.5 mol. %. In embodiments, the glass compositions described herein may include greater than or equal to 0.01 mol. % and less than or equal to 5.0 mol. % $La_2O_3$. In embodiments, the glass compositions described herein may include greater than or equal to 0.01 mol. % and less than or equal to 4.5 mol. % $La_2O_3$. In embodiments, the glass compositions described herein may include greater than or equal to 0.01 mol. % and less than or equal to 4.0 mol. % $La_2O_3$. In embodiments, the glass compositions described herein may include greater than or equal to 0.01 mol. % and less than or equal to 3.5 mol. % $La_2O_3$. In embodiments, the glass compositions described herein may include greater than or equal to 0.01 mol. % and less than or equal to 3.0 mol. % $La_2O_3$. In embodiments, the glass compositions described herein may include greater than or equal to 0.01 mol. % and less than or equal to 2.5 mol. % $La_2O_3$. In embodiments, the glass compositions described herein may include greater than or equal to 0.01 mol. % and less than or equal to 2.0 mol. % $La_2O_3$. In embodiments, the glass compositions described herein may include greater than or equal to 0.01 mol. % and less than or equal to 1.5 mol. % $La_2O_3$. In embodiments, the glass compositions described herein may include greater than or equal to 0.01 mol. % and less than or equal to 1.0 mol. % $La_2O_3$. In embodiments, the glass compositions described herein may include greater than or equal to 0.01 mol. % and less than or equal to 2.0 mol. % $La_2O_3$. In embodiments, the glass compositions described herein may include greater than or equal to 1.0 mol. % and less than or equal to 6.0 mol. % $La_2O_3$. In embodiments, the glass compositions described herein may include greater than or equal to 1.0 mol. % and less than or equal to 5.5 mol. % $La_2O_3$. In embodiments, the glass compositions described herein may include greater than or equal to 1.0 mol. % and less than or equal to 5.0 mol. % $La_2O_3$. In embodiments, the glass compositions described herein may include greater than or equal to 1.0 mol. % and less than or equal to 4.5 mol. % $La_2O_3$. In embodiments, the glass compositions described herein may include greater than or equal to 1.0 mol. % and less than or equal to 3.0 mol. % $La_2O_3$. In embodiments, the glass compositions described herein may include greater than or equal to 1.0 mol. % and less than or equal to 2.5 mol. % $La_2O_3$. In embodiments, the glass compositions described herein may include greater than or equal to 1.0 mol. % and less than or equal to 2.0 mol. % $La_2O_3$.

Additions of $Y_2O_3$ to the glass composition improves the hydrolytic, acid, and base resistances of the glass composition. In embodiments of the glass composition which include $Y_2O_3$, the $Y_2O_3$ may be present in the glass composition in an amount greater than or equal to 0.01 mol. % and less than or equal to 6 mol. %. In embodiments, the lower bound of the amount of $Y_2O_3$ in the glass composition may be greater than or equal to 0.01 mol. %, greater than or equal to 0.1 mol. %, greater than or equal to 0.2 mol. %, greater than or equal to 0.3 mol. %, greater than or equal to 0.4 mol. %, greater than or equal to 0.5 mol. %, greater than or equal to 0.6 mol. %, greater than or equal to 0.7 mol. %, greater than or equal to 0.8 mol. %, greater than or equal to 0.9 mol. %, greater or equal to 1.0 mol. %, greater than or equal to 1.5 mol. %, or even greater than or equal to 2 mol. %. In embodiments, the upper bound of the amount of $Y_2O_3$ in the glass composition may be less than or equal to 6.0 mol. %, less than or equal to 5.75 mol. %, less than or equal to 5.5 mol. %, less than or equal to 5 mol. %, less than or equal to 4.5 mol. %, less than or equal to 4.0 mol. %, less than or equal to 3.5 mol. %, less than or equal to 3.0 mol. %, less than or equal to 2.5 mol. %, or even less than or equal to 2.0 mol. %. It should be understood that the amount of $Y_2O_3$ in the glass compositions may be within a range formed from any one of the lower bounds for $Y_2O_3$ and any one of the upper bounds of $Y_2O_3$ described herein.

For example and without limitation, the glass compositions described may include $Y_2O_3$ in an amount greater than or equal to 0.01 mol. % and less than or equal to 5.5 mol. %. In embodiments, the glass compositions described herein may include greater than or equal to 0.01 mol. % and less than or equal to 5.0 mol. % $Y_2O_3$. In embodiments, the glass compositions described herein may include greater than or equal to 0.01 mol. % and less than or equal to 4.5 mol. % $Y_2O_3$. In embodiments, the glass compositions described herein may include greater than or equal to 0.01 mol. % and less than or equal to 4.0 mol. % $Y_2O_3$. In embodiments, the glass compositions described herein may include greater than or equal to 0.01 mol. % and less than or equal to 3.5 mol. % $Y_2O_3$. In embodiments, the glass compositions described herein may include greater than or equal to 0.01 mol. % and less than or equal to 3.0 mol. % $Y_2O_3$. In embodiments, the glass compositions described herein may include greater than or equal to 0.01 mol. % and less than or equal to 2.5 mol. % $Y_2O_3$. In embodiments, the glass compositions described herein may include greater than or equal to 0.01 mol. % and less than or equal to 2.0 mol. % $Y_2O_3$. In embodiments, the glass compositions described herein may include greater than or equal to 1.0 mol. % and less than or equal to 6.0 mol. % $Y_2O_3$. In embodiments, the glass compositions described herein may include greater than or equal to 1.0 mol. % and less than or equal to 5.5 mol. % $Y_2O_3$. In embodiments, the glass compositions described herein may include greater than or equal to 1.0 mol. % and less than or equal to 5.0 mol. % $Y_2O_3$. In embodiments, the glass compositions described herein may include greater than or equal to 1.0 mol. % and less than or equal to 4.5 mol. % $Y_2O_3$. In embodiments, the glass compositions described herein may include greater than or equal to 1.0 mol. % and less than or equal to 3.0 mol. % $Y_2O_3$. In embodiments, the glass compositions described herein may include greater than or equal to 1.0 mol. % and less than or equal to 2.5 mol. % $Y_2O_3$. In embodiments, the glass compositions described herein may include greater than or equal to 1.0 mol. % and less than or equal to 2.0 mol. % $Y_2O_3$.

In embodiments, the glass compositions may include combinations of at least two of $TiO_2$, $ZrO_2$, $HfO_2$, $La_2O_3$, and $Y_2O_3$. For example and without limitation, in embodiments, the glass compositions may include a combination of $TiO_2$ and $ZrO_2$. In these embodiments, the total amount of $TiO_2+ZrO_2$ (i.e., $TiO_2$ (mol. %)+$ZrO_2$ (mol. %)) may be greater than 0 and less than or equal to 6 mol. %., greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %. As another example, in embodiments, the glass compositions may include a combination of $TiO_2$, $ZrO_2$, and $HfO_2$. In these embodiments, the total amount of $TiO_2+ZrO_2+HfO_2$ (i.e., $TiO_2$ (mol. %)+$ZrO_2$ (mol. %)+$HfO_2$ (mol. %)) may be greater than 0 and less than or equal to 6 mol. %., greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %. As another example, in embodiments, the glass compositions may include a combination of $ZrO_2$ and $HfO_2$. In these embodiments, the total amount of $ZrO_2+HfO_2$ (i.e., $ZrO_2$ (mol. %)+$HfO_2$ (mol. %)) may be greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %. As another example, in embodiments, the glass compositions may include a combination of $ZrO_2$ and $Y_2O_3$. In these embodiments, the total amount of $ZrO_2+Y_2O_3$ (i.e., $ZrO_2$ (mol. %)+$Y_2O_3$ (mol. %)) may be greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %. As another example, in embodiments, the glass compositions may include a combination of $TiO_2$ and $Y_2O_3$. In these embodiments, the total amount of $TiO_2+Y_2O_3$ (i.e., $TiO_2$ (mol. %)+$Y_2O_3$ (mol. %)) may be greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %. As another example, in embodiments, the glass compositions may include a combination of $La_2O_3$ and $Y_2O_3$. In these embodiments, the total amount of $La_2O_3+Y_2O_3$ (i.e., $La_2O_3$ (mol. %)+$Y_2O_3$ (mol. %)) may be greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %. As another example, in embodiments, the glass compositions may include a combination of $ZrO_2$ and $La_2O_3$. In these embodiments, the total amount of $ZrO_2+La_2O_3$ (i.e., $ZrO_2$ (mol. %)+$La_2O_3$ (mol. %)) may be greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %. As another example, in embodiments, the glass compositions may include a combination of $TiO_2$ and $La_2O_3$. In these embodiments, the total amount of $TiO_2+La_2O_3$ (i.e., $TiO_2$ (mol. %)+$La_2O_3$ (mol. %)) may be greater than 0 and less than or equal to 5 mol. %., greater than 0 and less than or equal to 4 mol. %., greater than 0 and less than or equal to 3 mol. %., greater than 0 and less than or equal to 2 mol. %., or even greater than 0 and less than or equal to 1 mol. %.

In the embodiments of the glass compositions described herein, the total amount of $Al_2O_3$, $TiO_2$, $ZrO_2$, $HfO_2$, $La_2O_3$, and $Y_2O_3$ in the glass composition (i.e., $Al_2O_3$ (mol. %)+$TiO_2$ (mol. %)+$ZrO_2$ (mol. %)+$HfO_2$ (mol. %)+$La_2O_3$ (mol. %)+$Y_2O_3$ (mol. %)) is greater than or equal to 2 mol. % and less than or equal to 12 mol. %, greater than or equal to 3 mol. % and less than or equal to 12 mol. %, greater than or equal to 4 mol. % and less than or equal to 12 mol. %, greater than or equal to 5 mol. % and less than or equal to 12 mol. %, greater than or equal to 6 mol. % and less than or equal to 12 mol. %, greater than or equal to 6 mol. % and less than or equal to 11 mol. %, greater than or equal to 6 mol. % and less than or equal to 10 mol. %, greater than or equal to 6 mol. % and less than or equal to 9 mol. %, or even greater than or equal to 6 mol. % and less than or equal to 8 mol. %.

Boron oxide ($B_2O_3$) is a glass former which may be added to the glass compositions to reduce the viscosity at a given temperature (e.g., the strain, anneal and softening temperatures) thereby improving the formability of the glass. However, it has been found that additions of boron significantly decrease the diffusivity of sodium and potassium ions in the glass composition which, in turn, adversely impacts the ion exchange performance of the resultant glass. In particular, it has been found that additions of boron significantly increase the time required to achieve a given depth of compression relative to glass compositions which are boron free. Accordingly, in some embodiments described herein, the amount of boron added to the glass composition is minimized in order to improve the ion exchange performance of the glass composition.

The impact of boron on the ion exchange performance of a glass composition can be mitigated by controlling the ratio of the concentration of $B_2O_3$ to the difference between the total concentration of the alkali oxides (i.e., $R_2O$, where R is the alkali metals) and alumina (i.e., $B_2O_3$ (mol. %)/($R_2O$ (mol. %)-$Al_2O_3$ (mol. %))). In particular, it has been determined that when the ratio of $B_2O_3/(R_2O$—$Al_2O_3)$ is greater than or equal to about 0 and less than about 0.3 or even less than about 0.2, the diffusivities of alkali oxides in the glass compositions are not diminished and, as such, the ion exchange performance of the glass composition is maintained. Accordingly, in some embodiments, the ratio of $B_2O_3/(R_2O$—$Al_2O_3)$ is greater than 0 and less than or equal to 0.3. In some of these embodiments, the ratio of $B_2O_3/(R_2O$—$Al_2O_3)$ is greater than 0 and less than or equal to 0.2. In some embodiments, the ratio of $B_2O_3/(R_2O$—$Al_2O_3)$ is greater than 0 and less than or equal to 0.15 or even less than or equal to 0.1. In some other embodiments, the ratio of $B_2O_3/(R_2O$—$Al_2O_3)$ may be greater than 0 and less than or equal to 0.05. Maintaining the ratio $B_2O_3/(R_2O$—$Al_2O_3)$ to be less than or equal to 0.3 or even less than or equal to 0.2 permits the inclusion of $B_2O_3$ to lower the strain point, anneal point and softening point of the glass composition without the $B_2O_3$ adversely impacting the ion exchange performance of the glass.

In embodiments, the glass compositions may optionally include $B_2O_3$ to reduce the viscosity of the glass compositions at a given temperature, as described herein. In these embodiments, the glass composition may include greater than 0 mol. % $B_2O_3$ and less than or equal to 3 mol. % $B_2O_3$ such that the $B_2O_3$ does not diminish the ion exchange performance of the glass composition. In embodiments, the concentration of $B_2O_3$ in the glass composition is greater than 0 mol. % and less than or equal to 3 mol. %, greater than 0 mol. % and less than or equal to 2 mol. %, or even greater than 0 mol. % and less than or equal to 1 mol. %. For example, in embodiments where $B_2O_3$ is present in the glass composition, the concentration of $B_2O_3$ may be greater than 0.01 mol. % and less than or equal to 3 mol. %. In some embodiments, the $B_2O_3$ may be present in an amount greater than or equal to 0.01 mol. % and less than or equal to 2 mol. %, or even less than or equal to 1.5 mol. %. Alternatively, the $B_2O_3$ may be present in an amount greater than or equal to 1 mol. % and less than or equal to 3 mol. %, greater than or equal to 1 mol. % and less than or equal to 2 mol. % or even greater than or equal to 1 mol. % and less than or equal to 1.5 mol. %. In some embodiments, the concentration of $B_2O_3$ may be greater than or equal to 0.1 mol. % and less than or equal to 1.0 mol. %.

While in some embodiments the concentration of $B_2O_3$ in the glass composition is minimized to improve the forming properties of the glass without detracting from the ion exchange performance of the glass, in some embodiments the glass compositions are free from boron and compounds of boron such as $B_2O_3$. Specifically, it has been determined that forming the glass composition without boron or compounds of boron improves the ion exchangeability of the glass compositions by reducing the process time and/or temperature required to achieve a specific value of compressive stress and/or depth of compression.

In the embodiments described herein, the total amount of network formers in the glass composition (i.e., $SiO_2$ (mol. %)+$Al_2O_3$ (mol. %)+$TiO_2$ (mol. %)+$ZrO_2$ (mol. %)+$HfO_2$ (mol. %)+$La_2O_3$ (mol. %)+$Y_2O_3$ (mol. %)+$B_2O_3$ (mol. %)) is less than or equal to 90 mol. %. For example and without limitation, in embodiments the total amount of network formers in the glass compositions is greater than or equal to 72 mol. % and less than or equal to 90 mol. %. In embodiments, the total amount of network formers in the glass compositions is greater than or equal to 82 mol. % and less than or equal to 88 mol. %.

The glass compositions described herein may optionally further comprise one or more fining agents such as, for example, $SnO_2$, $As_2O_3$, $F^-$, $Ce_2O_3$, $Fe_2O_3$, $H_2O$, and/or $Cl^-$ (from NaCl or the like). When a fining agent is present in the glass composition, the fining agent may be present in an amount less than or equal to 1 mol. % or even less than or equal to 0.5 mol. %. In embodiments, the fining agent may be present in the glass composition in an amount greater than or equal to 0.01 mol. %, or even 0.05 mol. %, and less than or equal to 0.5 mol. %. In embodiments, the fining agent may be present in the glass composition in an amount greater than or equal 0.1 mol. % and less than or equal to 0.5 mol. %. For example, in some embodiments the glass composition may include $SnO_2$ as a fining agent. In these embodiments $SnO_2$ may be present in the glass composition in an amount greater than 0 mol. % and less than or equal to 1 mol. % or even an amount greater than or equal to 0.1 mol. % and less than or equal to 0.50 mol. %.

As noted herein, the presence of alkali oxides in the glass composition facilitates chemically strengthening the glass by ion exchange. Specifically, alkali ions, such as lithium ions, potassium ions, and/or sodium ions, are sufficiently mobile in the glass to facilitate ion exchange. In some embodiments, the glass composition is ion exchangeable to form a compressive stress layer having a depth of layer greater than or equal to 10 μm. In some embodiments, the depth of layer may be greater than or equal to 25 μm or even greater than or equal to 50 μm. In some other embodiments, the depth of the layer may be greater than or equal to 75 μm or even greater than or equal to 100 μm. In still other embodiments, the depth of layer may be greater than or equal to 10 μm and less than or equal to 100 μm. The associated surface compressive stress may be greater than or equal to 250 MPa, greater than or equal to 300 MPa or even greater than or equal to 350 MPa after the glass composition is treated in a salt bath of 100% molten $KNO_3$, 100% molten $NaNO_3$ or a mixed bath comprising $KNO_3$ and $NaNO_3$ at a temperature of 350° C. to 500° C. for a time period of less than 30 hours or even less than 20 hours.

Further, as noted hereinabove, the glass compositions described herein are chemically durable and resistant to degradation in acidic solutions, basic solutions, and water as determined by the DIN 12116 standard, the ISO 695 standard, and the ISO 720/ISO 719 standards, respectively. The chemical durability of the glass compositions makes the glass compositions particularly well suited for use as packaging material, such as glass vials, cartridges, ampoules, and other containers used for packaging pharmaceutical compositions.

Specifically, the DIN 12116 standard is a measure of the resistance of the glass to decomposition when placed in an acidic solution. In brief, the DIN 12116 standard utilizes a polished glass sample of a known surface area which is weighed and then positioned in contact with boiling hydrochloric acid. The sample is then removed from the solution, dried and weighed again. The glass mass lost during exposure to the acidic solution is a measure of the acid durability of the sample with smaller numbers indicative of greater durability. The results of the test are reported in units of half-mass per surface area, specifically $mg/dm^2$. The DIN 12116 standard is divided into individual classes. Class S1 indicates weight losses of up to 0.7 $mg/dm^2$; Class S2 indicates weight losses from 0.7 $mg/dm^2$ up to 1.5 $mg/dm^2$; Class S3 indicates weight losses from 1.5 $mg/dm^2$ up to 15 $mg/dm^2$; and Class S4 indicates weight losses of more than 15 $mg/dm^2$.

The ISO 695 standard is a measure of the resistance of the glass to decomposition when placed in a basic solution. In brief, the ISO 695 standard utilizes a polished glass sample which is weighed and then placed in a solution of boiling NaOH and $Na_2CO_3$. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically $mg/dm^2$. The ISO 695 standard is divided into individual classes. Class A1 indicates weight losses of up to 75 $mg/dm^2$; Class A2 indicates weight losses from 75 $mg/dm^2$ up to 175 $mg/dm^2$; and Class A3 indicates weight losses of more than 175 $mg/dm^2$.

The ISO 720 standard is a measure of the resistance of the glass to degradation in purified, $CO_2$-free water. In brief, the ISO 720 standard protocol utilizes crushed glass grains which are placed in contact with the purified, $CO_2$-free water at 121° C. and a pressure of 2 atmospheres. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 720 standard is divided into individual types. Type HGA1 is indicative of up to 62 μg extracted equivalent of $Na_2O$ per gram of glass tested; Type HGA2 is indicative of more than 62 μg and up to 527 μg extracted equivalent of $Na_2O$ per gram of glass tested; and Type HGA3 is indicative of more than 527 μg and up to 930 μg extracted equivalent of $Na_2O$ per gram of glass tested.

The ISO 719 standard is a measure of the resistance of the glass to degradation in purified, $CO_2$-free water. In brief, the ISO 719 standard protocol utilizes crushed glass grains which are placed in contact with the purified, $CO_2$-free water at a temperature of 98° C. and a pressure of 1 atmosphere. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 719 standard is divided into individual types. The ISO 719 standard is divided into individual types. Type HGB1 is indicative of up to 31 μg extracted equivalent of $Na_2O$; Type HGB2 is indicative of more than 31 μg and up to 62 μg extracted equivalent of $Na_2O$; Type HGB3 is indicative of more than 62 μg and up to 264 μg extracted equivalent of $Na_2O$; Type HGB4 is indicative of more than 264 μg and up to 620 μg extracted equivalent of $Na_2O$; and Type HGB5 is indicative of more than 620 μg and up to 1085 μg extracted equivalent of $Na_2O$. The glass compositions described herein have an ISO 719 hydrolytic resistance of type HGB2 or better with some embodiments having a type HGB1 hydrolytic resistance.

The glass compositions described herein have an acid resistance of class S2 or class S1 according to DIN 12116 before ion exchange strengthening. In embodiments, the glass compositions described herein have an acid resistance of class S2 or class S1 according to DIN 12116 both before and after ion exchange strengthening. Further, the glass compositions described herein have a base resistance according to ISO 695 of class A2 or even class A1 before ion exchange strengthening. In embodiments, the glass compositions described herein have a base resistance according to ISO 695 of class A2 or even class A1 before and after ion exchange strengthening. The glass compositions described herein also have an ISO 720 type HGA2 or a type HGA1 hydrolytic resistance both before ion exchange strengthening. In embodiments, the glass compositions described herein also have an ISO 720 type HGA2 or a type HGA1 hydrolytic resistance both before and after ion exchange strengthening. The glass compositions described herein have an ISO 719 hydrolytic resistance of type HGB1 before. In embodiments, the glass compositions described herein have an ISO 719 hydrolytic resistance of type HGB1 both before and after ion exchange strengthening.

In the embodiments described herein the glass compositions have an average coefficient of thermal expansion (CTE) of less than $65 \times 10^{-7}$/° C. or even less than $62 \times 10^{-7}$/° C. over the temperature range from 20° C. to 300° C. For example, in embodiments, the glass compositions have an average CTE of less than or equal to $62 \times 10^{-7}$/° C. and greater than or equal to $50 \times 10^{-7}$/° C. over the temperature range from 20° C. to 300° C. These relatively low CTE values improve the survivability of the glass to thermal cycling or thermal stress conditions compared to glass compositions with relatively higher CTEs.

In the embodiments described herein, the glass compositions have an elastic modulus of greater than or equal to 75 GPa. For example, in embodiments, the glass compositions have an elastic modulus of greater than or equal to 78 GPa and less than or equal to 88 GPa. In embodiments, the glass compositions have an elastic modulus of greater than or equal to 80 GPa and less than or equal to 86 GPa.

In the embodiments described herein, the glass compositions have shear modulus of greater than or equal to 30 GPa. For example, in embodiments, the glass compositions have shear modulus of greater than or equal to 30 GPa and less than or equal to 40 GPa. In embodiments, the glass compositions have a shear modulus of greater than or equal to 32 GPa and less than or equal to 36 GPa.

The glass compositions described herein may generally have a strain point greater than or equal to about 500° C. and less than or equal to about 650° C. or even less than or equal to 620° C. The glass compositions may also have an anneal point greater than or equal to about 550° C. and less than or equal to about 725° C. or even less than or equal to 680° C. The glass compositions described herein may have a softening point greater than or equal to about 830° C. and less than or equal to about 900° C. The glass compositions may also have a liquidus temperature greater than or equal to 800° C. and less than or equal to 1350° C. due to the addition of one or more of $TiO_2$, $ZrO_2$, $HfO_2$, $La_2O_3$, and $Y_2O_3$, which may increase the liquidus temperature. In embodiments, the liquidus temperature may be less than or equal to 1350° C., less than or equal 1150° C., less than or equal to 1000° C., or even less than or equal to 900° C.

The glass compositions described herein are formed by mixing a batch of glass raw materials (e.g., powders of $SiO_2$, $Al_2O_3$, alkali oxides, alkaline earth oxides and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard forming techniques to shape the glass composition into a desired final form. Alternatively, the glass article may be shaped into a stock form, such as a sheet, tube or the like, and subsequently reheated and formed into the desired final form.

The glass compositions described herein may be shaped into glass articles having various forms such as, for example, sheets, tubes or the like. However, given the chemical durability of the glass composition, the glass compositions described herein are particularly well suited for use in the formation of glass articles used as pharmaceutical packages or pharmaceutical containers for containing pharmaceutical compositions, such as liquids, powders and the like. For example, the glass compositions described herein may be used to form glass containers having various shape forms including, without limitation, Vacutainers®, cartridges, syringes, ampoules, bottles, flasks, phials, tubes, beakers, vials or the like. Moreover, the ability to chemically strengthen the glass compositions through ion exchange can be utilized to improve the mechanical durability of such pharmaceutical packaging or glass articles formed from the glass composition. Accordingly, it should be understood that, in at least one embodiment, the glass compositions are incorporated in a pharmaceutical package in order to improve the chemical durability and/or the mechanical durability of the pharmaceutical packaging.

Examples

The embodiments described herein will be further clarified by the following examples.

Samples of the glasses listed in Table 1 were formed and properties of each sample were measured. In particular, the shear modulus (GPa), elastic modulus (GPa), strain point (° C.), annealing point (° C.), softening point (° C.), liquidus temperature (° C.), CTE ($\times 10^{-7}$/° C.), hydrolytic resistance according to ISO 720, acid resistance according to DIN 12116, and base resistance according to ISO 695 were determined to assess the effects of the addition of one or more of $TiO_2$, $ZrO_2$, $HfO_2$, $La_2O_3$, and $Y_2O_3$ on the properties of the glass composition. The properties (where measured) of each glass composition are reported in Table 2. Examples 26-33 are comparative examples (i.e., glass compositions that do not include at least one of $TiO_2$, $ZrO_2$, $HfO_2$, $La_2O_3$, and $Y_2O_3$).

TABLE 1

Glass Compositions

| Ex. | $SiO_2$ | $Al_2O_3$ | $Na_2O$ | $K_2O$ | $Li_2O$ | MgO | CaO | $SnO_2$ | $TiO_2$ | $ZrO_2$ | $HfO_2$ | $La_2O_3$ | $Y_2O_3$ | $B_2O_3$ |
|---|---|---|---|---|---|---|---|---|---|---|---|---|---|---|
| 1 | 75.14 | 6.25 | 1.85 | 1.87 | 7.33 | 5.22 | 0.21 | 0.20 | 1.91 | | | | | |
| 2 | 73.74 | 6.11 | 1.82 | 1.83 | 7.20 | 5.11 | 0.19 | 0.21 | 3.76 | | | | | |
| 3 | 72.44 | 5.97 | 1.76 | 1.80 | 7.10 | 4.94 | 0.19 | 0.21 | 5.57 | | | | | |
| 4 | 75.22 | 6.26 | 1.80 | 1.87 | 7.33 | 5.23 | 0.19 | 0.21 | 0.03 | 1.84 | | | | |
| 5 | 73.88 | 6.19 | 1.79 | 1.86 | 7.26 | 5.15 | 0.19 | 0.21 | 0.02 | 3.43 | | | | |
| 6 | 72.98 | 6.13 | 1.77 | 1.84 | 7.17 | 5.11 | 0.18 | 0.20 | 0.03 | 4.58 | | | | |
| 7 | 75.15 | 6.22 | 1.80 | 1.88 | 7.39 | 5.21 | 0.19 | 0.21 | 0.01 | 0.03 | 1.90 | | | |
| 8 | 73.74 | 6.11 | 1.77 | 1.84 | 7.25 | 5.13 | 0.19 | 0.20 | 0.01 | 0.03 | 3.71 | | | |
| 9 | 76.18 | 6.32 | 1.93 | 1.94 | 7.53 | 5.22 | 0.20 | 0.21 | | 0.47 | 0.01 | | | |
| 10 | 76.00 | 6.33 | 1.95 | 1.97 | 7.59 | 5.26 | 0.19 | 0.22 | | 0.24 | 0.25 | | | |
| 11 | 76.15 | 6.32 | 1.93 | 1.94 | 7.51 | 5.26 | 0.19 | 0.21 | | 0.00 | 0.49 | | | |
| 12 | 76.11 | 6.31 | 1.96 | 4.90 | 4.60 | 5.24 | 0.20 | 0.21 | | 0.47 | 0.01 | | | |
| 13 | 76.23 | 6.29 | 1.93 | 5.71 | 3.76 | 5.18 | 0.18 | 0.21 | | 0.02 | 0.48 | | | |
| 14 | 75.97 | 6.32 | 1.97 | 4.93 | 4.65 | 5.24 | 0.20 | 0.22 | | 0.01 | 0.49 | | | |
| 15 | 76.05 | 6.35 | 1.93 | 5.70 | 3.87 | 5.23 | 0.18 | 0.22 | | 0.48 | 0.01 | | | |
| 16 | 76.07 | 6.34 | 1.94 | 5.67 | 3.83 | 5.26 | 0.18 | 0.21 | | | | 0.50 | | |
| 17 | 78.30 | 2.85 | 1.95 | 1.95 | 7.79 | 4.80 | 0.16 | 0.20 | | 1.00 | 1.00 | | | |
| 18 | 78.30 | 2.85 | 2.86 | 5.03 | 3.80 | 4.80 | 0.16 | 0.20 | | 1.00 | 1.00 | | | |
| 19 | 78.30 | 2.85 | 3.94 | 3.15 | 4.60 | 4.80 | 0.16 | 0.20 | | 1.00 | 1.00 | | | |
| 20 | 80.72 | 1.84 | 3.64 | 2.92 | 4.56 | 3.95 | 0.17 | 0.21 | 0.01 | 1.97 | | | | |
| 21 | 79.03 | 2.84 | 3.65 | 2.93 | 4.56 | 4.63 | 0.17 | 0.21 | 0.01 | 1.96 | | | | |
| 22 | 79.23 | 2.86 | 7.17 | 3.74 | 0.00 | 4.65 | 0.16 | 0.21 | 0.01 | 1.96 | | | | |
| 23 | 79.07 | 2.85 | 3.65 | 2.91 | 4.57 | 4.63 | 0.17 | 0.22 | 1.94 | | | | | |
| 24 | 79.09 | 2.85 | 3.63 | 2.92 | 4.53 | 4.63 | 0.17 | 0.20 | 0.01 | 0.98 | | | 0.97 | |
| 25 | 79.02 | 4.87 | 3.62 | 2.90 | 4.56 | 4.62 | 0.17 | 0.22 | 0.01 | | | | | |
| 26 | 76.40 | 6.40 | 1.90 | 1.90 | 7.70 | 5.20 | 0.20 | 0.20 | | | | | | |
| 27 | 76.55 | 6.25 | 1.97 | 4.92 | 4.62 | 5.27 | 0.18 | 0.21 | | | | | | |
| 28 | 76.59 | 6.17 | 1.97 | 5.69 | 3.81 | 5.34 | 0.18 | 0.21 | | | | | | |
| 29 | 76.76 | 6.22 | 2.79 | 4.91 | 3.72 | 5.20 | 0.18 | 0.21 | | | | | | |
| 30 | 76.33 | 6.37 | 3.90 | 3.12 | 4.55 | 5.32 | 0.18 | 0.21 | | | | | | |
| 31 | 75.02 | 6.23 | 1.87 | 1.89 | 7.35 | 5.22 | 0.19 | 0.21 | | | | | | 1.97 |
| 32 | 73.62 | 6.10 | 1.85 | 1.85 | 7.27 | 5.12 | 0.20 | 0.20 | | | | | | 3.76 |
| 33 | 72.31 | 5.94 | 1.81 | 1.80 | 7.16 | 4.97 | 0.19 | 0.20 | | | | | | 5.61 |

TABLE 2

| Ex. # | Density g/cm³ | SOC (nm/mm/Mpa) | Shear Modulus GPa | Elastic Modulus GPa | Strain Point ° C. | Annealing Point ° C. | Softening Point ° C. | Liquidus Temp. ° C. | CTE ×10⁻⁷/° C. | ISO 720 µg/g | DIN 12116 mg/dm² | ISO 695 mg/dm² |
|---|---|---|---|---|---|---|---|---|---|---|---|---|
| 1 | 2.398 | 3.021 | 33.4 | 80.1 | 525.5 | 570.3 | | 1095 | 58.8 | 39.3 | −0.5 | −57.5 |
| 2 | 2.421 | | 33.8 | 81.0 | 531.9 | 577.3 | | 1070 | 58.5 | 39.2 | −0.6 | −52.1 |
| 3 | 2.445 | | 34.3 | 82.2 | | | | 1165 | 61 | 36.8 | −0.7 | −54.3 |
| 4 | 2.433 | 3.085 | 34.0 | 81.7 | 554.1 | 603.5 | 849.4 | >1315 | 56 | 46.1 | −0.4 | −33.4 |
| 5 | 2.481 | 3.093 | 34.7 | 83.7 | 589.0 | 637.1 | 869.5 | >1325 | 56 | 46.0 | −0.6 | −25.8 |
| 6 | 2.517 | 3.122 | 35.4 | 85.2 | 604.7 | 652.5 | 883.2 | >1320 | 55 | 43.6 | −0.7 | −22.5 |
| 7 | 2.497 | 2.994 | 34.0 | 81.6 | 599.8 | 649.0 | 861.4 | >1300 | 57 | 39.7 | −0.5 | −30.9 |
| 8 | 2.593 | 3.071 | 35.3 | 84.8 | 559.7 | 609.4 | 889.5 | >1285 | 54 | 37.2 | | −20.7 |
| 9 | | | | | | | | 1095 | | 46.2 | −0.6 | −62.3 |
| 10 | | | | | | | | 1090 | | 47.9 | −0.5 | −60.1 |
| 11 | | | | | | | | 1105 | | 45.7 | −0.6 | −64.9 |
| 12 | | | | | | | | 1080 | | 42.0 | −0.6 | −63.0 |
| 13 | | | | | | | | 1080 | | 60.3 | −0.8* | −72.4 |
| 14 | | | | | | | | 1085 | | 44.3 | −0.5 | −67.9 |
| 15 | | | | | | | | 1075 | | 49.1 | −0.6 | −67.9 |
| 16 | | | | | | | | 1035 | | 42.9 | −0.9* | −68.3 |
| 17 | | | | | 515.2 | 562.7 | | 1140 | 5.7 | 55.0 | −0.3 | −35.3 |
| 18 | | | | | 525.5 | 578.5 | | <990 | 6.8 | 60.3 | −0.4 | −38.9 |
| 19 | | | | | 516.6 | 567.5 | | 1010 | 6.6 | 56.8 | −0.3 | −37.1 |
| 20 | | | | | 500.6 | 551.4 | | 1145 | | 59.3 | −0.3 | −26.2 |
| 21 | | | | | 515.4 | 565.9 | | 1055 | | 52.4 | −0.3 | −25.0 |
| 22 | | | | | 573.4 | 628.5 | | <880 | | 68.8* | −0.3 | −26.1 |
| 23 | | | | | 489.8 | 535.9 | | 1080 | | 66.0* | −0.3 | −50.5 |
| 24 | | | | | 532.5 | 582.5 | | 1035 | | 55.1 | −0.3 | −14.4 |
| 25 | | | | | 498.6 | 548.9 | | 935 | | 48.1 | −0.2 | −53.1 |
| 26 | 2.37 | 2.997 | 33.1 | 79.5 | 517 | 566 | 818 | 1105 | 6.0 | 41.9 | −0.4 | −48.0 |
| 27 | | 3.012 | 31.3 | 74.5 | 530 | 581 | 849 | 1065 | 6.5 | 48.0 | −0.4 | −77.0 |
| 28 | | 2.980 | 30.7 | 73.2 | 537 | 589 | 867 | 1035 | 6.6 | 48.0 | −0.4 | −75.0 |
| 29 | | 3.016 | 31.0 | 74.5 | 530 | 582 | 856 | 1045 | 6.8 | 50.3 | −0.4 | −70.0 |
| 30 | | 3.003 | 32.9 | 79.0 | 513 | 562 | 835 | 1080 | 6.0 | 44.8 | −0.4 | −59.8 |
| 31 | 2.37 | 3.025 | 32.7 | 78.5 | 496 | 543 | 783 | 1055 | 5.8 | 40.0 | −0.4 | −71.4 |
| 32 | 2.37 | 3.077 | 32.4 | 77.9 | 493 | 536 | 758 | 1040 | 5.7 | 38.4 | −0.6 | −82.9* |
| 33 | 2.36 | 3.131 | 32.1 | 77.3 | 493 | 533 | 734 | 1015 | 5.7 | 37.4 | −1.0* | −95.2* |

As shown in Table 2, additions of $TiO_2$ generally improved the hydrolytic resistance of the glass compositions while causing a slight increase in the average coefficient of thermal expansion of the glass. Additions of $ZrO_2$ generally improved the base resistance of the glass while also decreasing the average coefficient of thermal expansion of the glass. Additions of $HfO_2$ improved the base resistance and the hydrolytic resistance of the glass composition while also decreasing the average coefficient of thermal expansion of the glass composition. Additions of $Y_2O_3$ improved both the acid resistance and the base resistance of the glass composition while maintaining the hydrolytic resistance of the glass at acceptable levels. Additions of $La_2O_3$ to the glass provided a glass with acceptable acid resistance, base resistance, and hydrolytic resistance.

Examples 1-11 and 17 can be compared to Example 26 to illustrate the improvement of the chemical durability of the glass compositions due to additions of $TiO_2$, $ZrO_2$, and $HfO_2$. Specifically, additions of $TiO_2$, $ZrO_2$, and/or $HfO_2$ improved the hydrolytic and base resistances of the glass compositions relative to Example 26 resulting in more chemically durable glass compositions.

Examples 12 and 14 can be compared to Example 27 to illustrate the improvement in the chemical durability of the glass compositions due to additions $ZrO_2$ and $HfO_2$. Specifically, additions of $ZrO_2$ and $HfO_2$ improved the hydrolytic and base resistances of the glass compositions relative to Example 27 resulting in more chemically durable glass compositions.

Examples 13, 15 and 16 can be compared to Example 28 to illustrate the improvement in the chemical durability of the glass compositions due to additions $ZrO_2$ and $HfO_2$ and the improvement in the chemical durability of the glass compositions due to additions of $La_2O_3$. Specifically, additions of $ZrO_2$ and $HfO_2$ and additions of $La_2O_3$ improved the base resistance of the glass compositions relative to Example 28 resulting in more chemically durable glass compositions.

Example 18 can be compared to Example 29 to illustrate the improvement in the chemical durability of the glass composition as a result of modifications to the glass composition of Example 29. Specifically, decreasing the $Al_2O_3$ concentration and increasing the concentrations of $ZrO_2$, $HfO_2$, and $SiO_2$ improved the base resistance of the glass composition and decreased the liquidus temperature.

Example 19 can be compared to Example 30 to illustrate the improvement in the chemical durability of the glass compositions as a result of modifications to the glass composition of Example 30. Specifically, decreasing the $Al_2O_3$ concentration and increasing the concentrations of $ZrO_2$, $HfO_2$, and $SiO_2$ improved the acid and base resistances of the glass composition and decreased the liquidus temperature.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   greater than or equal to 71 mol. % and less than or equal to 83 mol. % $SiO_2$;
   greater than or equal to 1 mol. % and less than or equal to 11 mol. % $Al_2O_3$;
   greater than or equal to 8 mol. % and less than or equal to 11 mol. % alkali oxide, the alkali oxide comprising greater than 3 mol. % and less than or equal to 8 mol. % $Li_2O$ and at least one of $Na_2O$ and $K_2O$;
   greater than or equal to 1 mol. % and less than or equal to 8 mol. % alkaline earth oxide, the alkaline earth oxide comprising MgO and at least one of CaO, BaO, and SrO; and
   at least one of $TiO_2$, $ZrO_2$, $HfO_2$, $La_2O_3$ and $Y_2O_3$, wherein $TiO_2$ (mol. %)+$ZrO_2$ (mol. %)+$HfO_2$ (mol. %)+$La_2O_3$ (mol. %)+$Y_2O_3$ (mol. %) is greater than 0 mol. % and less than or equal to 6 mol. % and $Al_2O_3$ (mol. %)+$TiO_2$ (mol. %)+$ZrO_2$ (mol. %)+$HfO_2$ (mol. %)+$La_2O_3$ (mol. %)+$Y_2O_3$ (mol. %) is greater than or equal to 2 mol. % and less than or equal to 12 mol. %,
   wherein the glass composition comprises $TiO_2$ and $ZrO_2$, and $TiO_2$ (mol. %)+$ZrO_2$ (mol. %) is less than or equal to 6 mol. %; and
   wherein the glass composition is free from boron.

2. The glass composition of claim 1, wherein $SiO_2$ (mol. %)+$Al_2O_3$ (mol. %)+$TiO_2$ (mol. %)+$ZrO_2$ (mol. %)+$HfO_2$ (mol. %)+$La_2O_3$ (mol. %)+$Y_2O_3$ (mol. %)+$B_2O_3$ (mol. %) is less than or equal to 90 mol. %.

3. The glass composition of claim 1, wherein $TiO_2$ (mol. %)+$ZrO_2$ (mol. %) is less than or equal to 4 mol. %.

4. The glass composition of claim 1, wherein $TiO_2$ (mol. %)+$ZrO_2$ (mol. %) is less than or equal to 2 mol. %.

5. The glass composition of claim 1, wherein the glass composition comprises $HfO_2$.

6. The glass composition of claim 5, wherein $TiO_2$ (mol. %)+$ZrO_2$ (mol. %)+$HfO_2$ (mol. %) is less than or equal to 6 mol. %.

7. The glass composition of claim 5, wherein $TiO_2$ (mol. %)+$ZrO_2$ (mol. %)+$HfO_2$ (mol. %) is less than or equal to 5 mol. %.

8. The glass composition of claim 5, wherein $ZrO_2$ (mol. %)+$HfO_2$ (mol. %) is less than or equal to 4.0 mol. %.

9. The glass composition of claim 5, wherein $ZrO_2$ (mol. %)+$HfO_2$ (mol. %) is less than or equal to 2.0 mol. %.

10. The glass composition of claim 5, wherein the $ZrO_2$ (mol. %)+$HfO_2$ (mol. %) is less than or equal to 0.5 mol. %.

11. The glass composition of claim 1, wherein the glass composition comprises $La_2O_3$ and a concentration of $La_2O_3$ is less than or equal to 1 mol. %.

12. The glass composition of claim 1, wherein the glass composition comprises $ZrO_2$ and a concentration of $ZrO_2$ greater than 1 mol. %.

13. The glass composition of claim 12, wherein the glass composition comprises $ZrO_2$ and the concentration of $ZrO_2$ is less than or equal to 5 mol. %.

14. The glass composition of claim 1, wherein the glass composition comprises $HfO_2$ and a concentration of $HfO_2$ is less than or equal to 4 mol. %.

15. The glass composition of claim 1, wherein the glass composition comprises $TiO_2$ and a concentration of $TiO_2$ is greater than 1 mol. %.

16. The glass composition of claim 15, wherein the glass composition comprises $TiO_2$ and the concentration of $TiO_2$ is less than or equal to 6 mol. %.

17. The glass composition of claim 1, wherein the glass composition comprises $Y_2O_3$ and a concentration of $Y_2O_3$ is less than or equal to 1 mol. %.

18. The glass composition of claim 1, wherein $SiO_2$ is greater than or equal to 72 mol. % and less than or equal to 79 mol. %.

19. The glass composition of claim 1, wherein $SiO_2$ is greater than or equal to 73 mol. % and less than or equal to 78 mol. %.

20. The glass composition of claim 1, wherein $Al_2O_3$ is greater than or equal to 2 mol. % and less than or equal to 8 mol. %.

21. The glass composition of claim 1, wherein $Al_2O_3$ is greater than or equal to 4 mol. % and less than or equal to 8 mol. %.

22. The glass composition of claim 1, wherein $Al_2O_3$ is greater than or equal to 5 mol. % and less than or equal to 7 mol. %.

23. The glass composition of claim 1, wherein $Li_2O$ (mol. %)>$Na_2O$ (mol. %)>$K_2O$ (mol. %).

24. The glass composition of claim 1, wherein $Li_2O$ is greater than or equal to 4 mol. % and less than or equal to 8 mol. %.

25. The glass composition of claim 24, wherein $Li_2O$ is less than or equal to 7 mol. %.

26. The glass composition of claim 1, wherein $Na_2O$ is greater than or equal to 1 mol. % and less than or equal to 5 mol. %.

27. The glass composition of claim 26, wherein $Na_2O$ is less than 3 mol. %.

28. The glass composition of claim 26, wherein $Na_2O$ is less than 2.5 mol. %.

29. The glass composition of claim 26, wherein $Na_2O$ is less than 2.0 mol. %.

30. The glass composition of claim 1, wherein $K_2O$ is greater than or equal to 1 mol. % and less than or equal to 7 mol. %.

31. The glass composition of claim 30, wherein $K_2O$ is less than 5 mol. %.

32. The glass composition of claim 1, wherein the alkaline earth oxide comprises greater than or equal to 4 mol. % and less than or equal to 8 mol. % MgO and less than or equal to 1 mol. % of at least one of CaO, BaO, and SrO.

33. The glass composition of claim 32, wherein the alkaline earth oxide comprises less than or equal to 0.5 mol. % CaO.

34. The glass composition of claim 1, further comprising greater than or equal to about 0.01 mol. % and less than or equal to 0.5 mol. % of a fining agent.

35. The glass composition of claim 34, wherein the fining agent is $SnO_2$.

36. The glass composition of claim 1, wherein the glass composition has an average coefficient of thermal expansion of less than or equal to $65 \times 10^{-7}$/° C. and greater than or equal to $50 \times 10^{-7}$/° C. over a temperature range from about 20° C. to about 300° C.

37. The glass composition of claim 1, wherein the glass composition has an average coefficient of thermal expansion of less than or equal to $62 \times 10^{-7}$/° C. and greater than or equal to $50 \times 10^{-7}$/° C. over a temperature range from about 20° C. to about 300° C.

38. The glass composition of claim 1, wherein the glass composition has a hydrolytic resistance of class HGA 1 according to ISO 720:1985 before strengthening by ion exchange.

39. The glass composition of claim 38, wherein the glass composition has a hydrolytic resistance of class HGA 1 according to ISO 720:1985 after strengthening by ion exchange.

40. The glass composition of claim 1, wherein the glass composition has a base resistance of class A1 or class A2 according to ISO 695:1991 before strengthening by ion exchange.

41. The glass composition of claim 40, wherein the glass composition has a base resistance of class A1 or class A2 according to ISO 695:1991 after strengthening by ion exchange.

42. The glass composition of claim 1, wherein the glass composition has an acid resistance of class S2 or class S1 according to DIN 12116 (2001) before strengthening by ion exchange.

43. The glass composition of claim 42, wherein the glass composition has an acid resistance of class S2 or class S1 according to DIN 12116 (2001) after strengthening by ion exchange.

44. The glass composition of claim 1, wherein:

a strain point of the glass composition is greater than or equal to 500° C. and less than or equal to 650° C.;

an anneal point of the glass composition is greater than or equal to 550° C. and less than or equal to 725° C.;

a softening point of the glass composition is greater than or equal to 830° C. and less than or equal to 900° C.; and a liquidus temperature of the glass composition is greater than or equal to 800° C. and less than or equal to 1350° C.

45. The glass composition of claim 1, wherein a mass of glass lost during exposure of the glass composition to a basic solution according to ISO 695:1991 is from 14.4 mg/dm$^2$ to 33.4 mg/dm$^2$.

46. A glass pharmaceutical package formed from the glass compositions of claim 1.

* * * * *